US008786696B2

United States Patent
Ho

(10) Patent No.: US 8,786,696 B2
(45) Date of Patent: Jul. 22, 2014

(54) PROTECTOR OF HANDHELD ELECTRONIC DEVICES

(71) Applicant: Kenneth Kam-Sing Ho, Richmond (CA)

(72) Inventor: Kenneth Kam-Sing Ho, Richmond (CA)

( * ) Notice: Subject to any disclaimer, the term of this patent is extended or adjusted under 35 U.S.C. 154(b) by 0 days.

(21) Appl. No.: 13/758,435

(22) Filed: Feb. 4, 2013

(65) Prior Publication Data

US 2013/0213856 A1    Aug. 22, 2013

Related U.S. Application Data

(63) Continuation of application No. 12/814,432, filed on Jun. 11, 2010, now Pat. No. 8,368,748.

(51) Int. Cl.
*H04N 7/18* (2006.01)
*H04N 5/225* (2006.01)
*G03B 17/08* (2006.01)

(52) U.S. Cl.
USPC ............................... 348/81; 348/373; 396/27

(58) Field of Classification Search
USPC .................. 348/81, 373–376; 396/25–29
See application file for complete search history.

(56) References Cited

U.S. PATENT DOCUMENTS

| 4,025,930 | A | * | 5/1977 | Wolff | 396/29 |
| 5,126,772 | A | * | 6/1992 | Albrecht | 396/26 |
| 5,298,928 | A | * | 3/1994 | Suzuki et al. | 396/26 |
| 5,339,124 | A | * | 8/1994 | Harms | 396/27 |
| 5,514,843 | A | * | 5/1996 | Wilfong et al. | 200/5 R |
| 6,014,522 | A | * | 1/2000 | Reber, II | 396/29 |
| 8,368,748 | B2 | * | 2/2013 | Ho | 348/81 |
| 8,564,950 | B2 | * | 10/2013 | Rayner | 361/679.55 |
| 2006/0113173 | A1 | * | 6/2006 | Matsumoto et al. | 200/302.2 |

FOREIGN PATENT DOCUMENTS

JP    2007093762 A  *  4/2007

OTHER PUBLICATIONS iSkin eXo iPod Case Review, Oct. 27, 2003, retrieved on Dec. 5, 2009, <URL:http://the-gadgeteer.com/2003/10/27/iskin_exo_ipod_case_review.>, 10 pgs.*

* cited by examiner

*Primary Examiner* — Timothy J Henn

(57) ABSTRACT

An improved protector allows the operation of camera buttons to operate at greater depths through use of a "see-saw" mechanism proximate the camera buttons.

5 Claims, 29 Drawing Sheets

SECTION A-A

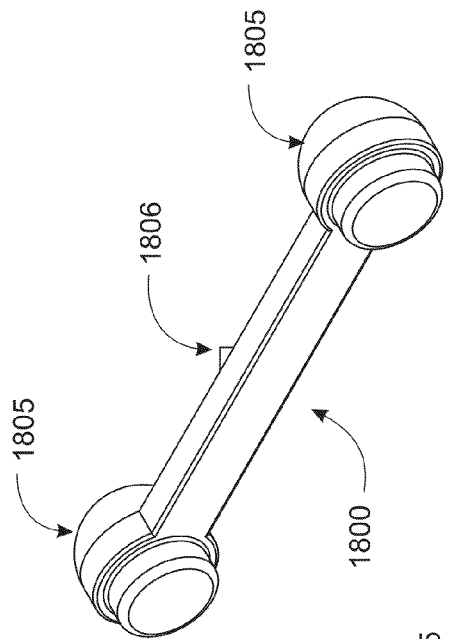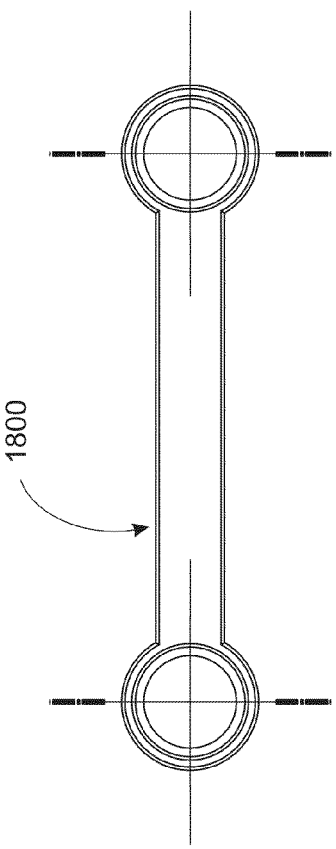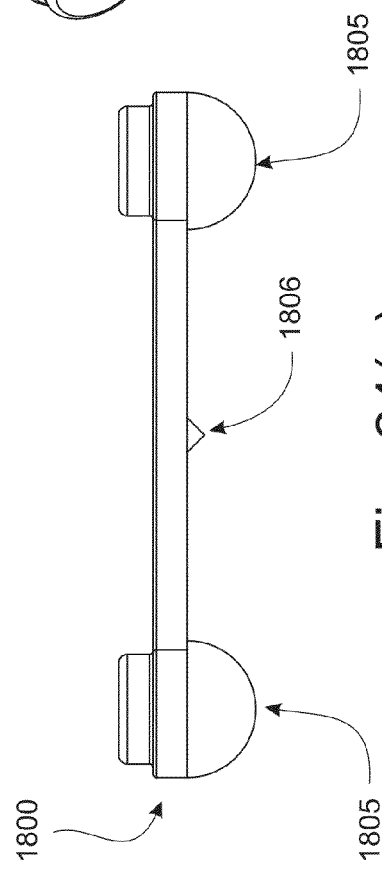
Fig. 24(a)
Fig. 24(b)
Fig. 24(c)
Fig. 24(d)

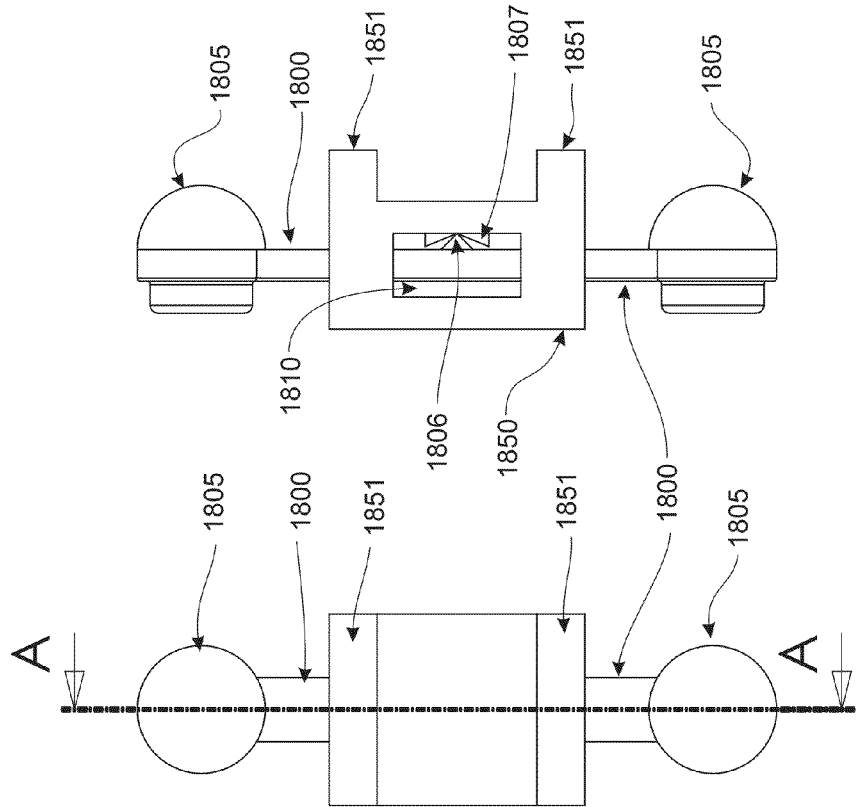
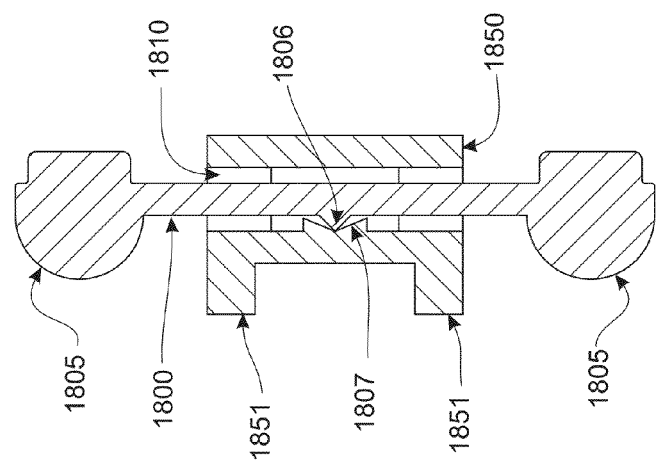
Fig. 25(a) SECTION A-A
Fig. 25(b)
Fig. 25(c)

SECTION A-A

PROTECTOR OF HANDHELD ELECTRONIC DEVICES

CROSS-REFERENCE TO RELATED APPLICATION

This application is a continuation of U.S. patent application Ser. No. 12/814,432 (now U.S. Pat. No. 8,368,748) and the entire disclosure thereof is incorporated herein by reference.

FIELD OF THE INVENTION

This invention relates to the protection of handheld electronic devices against traumas.

BACKGROUND OF THE INVENTION

This invention addresses some of the problems with protecting handheld electronic devices (such as digital cameras, cell phones, video games consoles, handheld personal digital assistants (PDAs)) against environmental traumas (such as water and dust) and mechanical traumas (such as shock).

SUMMARY OF THE INVENTION

There is provided a protection for an electronic device having a function member and a display for user viewing, comprising: a synthetic skin that encases the device by snugly fitting thereabout to provide a water-tight enclosure thereof and permits a user to operate the function member by pressing the corresponding portion of said skin; wherein said skin has a hole that is dimensioned to permit the device to be inserted therethrough and manipulated to be encased by said skin, and said skin hole is profiled for visual alignment with the device display when the device is encased.

BRIEF DESCRIPTION OF THE DRAWINGS

All Figures herein are drawn for ease of explanation of the basic teachings of the present invention only; the extensions of the Figures with respect to number, position, relationship, and dimensions of the parts to form the preferred embodiment are explained or are within the skill of the art after the following teachings of the present invention have been read and understood. Further, the exact dimensions and dimensional proportions to conform to specific pressure, force, weight, strength, and similar requirements will likewise be within the skill of the art after the following teachings of the present invention have been read and understood. A better understanding of the present invention can be obtained when the following detailed description of the preferred embodiment is considered in conjunction with the following Figures, in which:

FIG. 18b is a back perspective view of a lock in open position, associated with the skin of FIG. 18a.

FIG. 19 is a front perspective view of a cell phone being inserted into the skin of FIG. 18a.

FIG. 21b is a back perspective view of a lock in open position, associated with the skin of FIG. 21a.

FIG. 22 is a top perspective view of a game console being inserted into the skin of FIG. 21a.

FIG. 24 (a) is a front elevational view of the "see-saw" beam.

FIG. 24 (b) is a perspective view of the "see-saw" beam.

FIG. 24 (c) is a side elevational view of the "see-saw" beam.

FIG. 24 (d) is a top elevational view of the "see-saw" beam.

FIG. 25 (a) is a cross-sectional view of the "see-saw" beam within its support taken along plane A-A of FIG. 25(b).

FIG. 25 (b) is a bottom plan view of the "see-saw" beam within its support.

FIG. 25 (c) is a side elevational view of the "see-saw" beam within its support.

FIG. 26 (b) is a side cross-sectional view (taken along plane A-A of FIG. 26(a)) of the "see-saw" beam within its support in conjunction with the camera within its skin.

DETAILED DESCRIPTION OF THE PREFERRED EMBODIMENT

Notice Regarding Copyrighted Material

Figure 1:
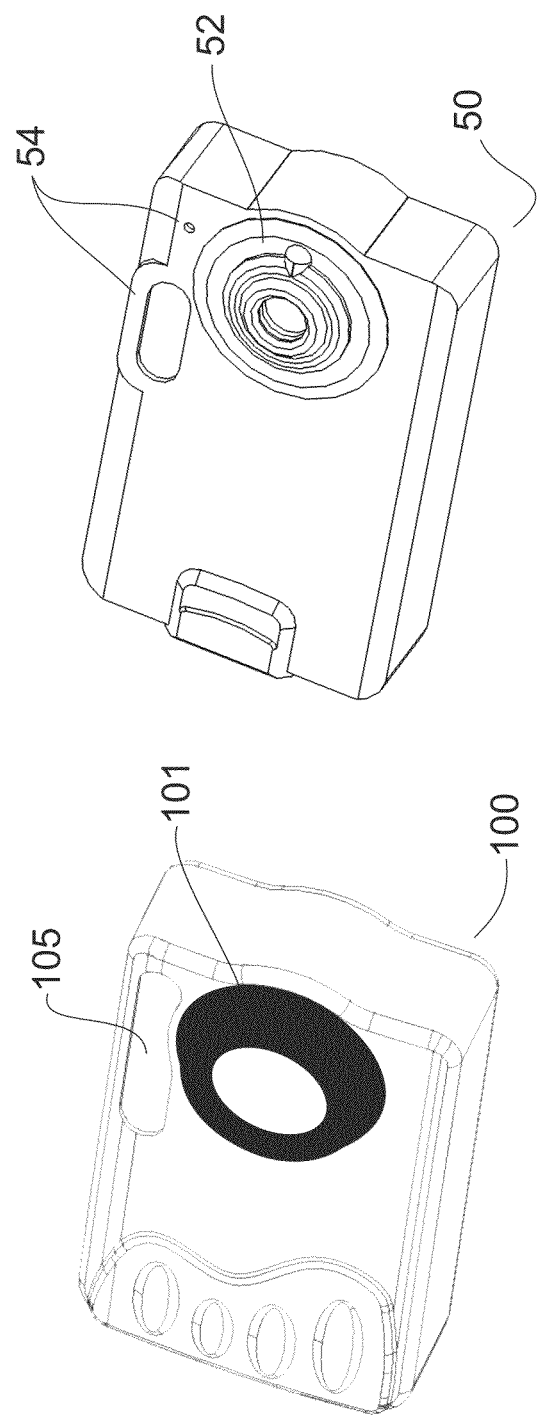
FIG. 1 is a front perspective view of a digital camera and a skin therefor according to this invention.

A portion of the disclosure of this patent document contains material which is subject to copyright protection. The copyright owner has no objection to the facsimile reproduction by anyone of the patent document or the patent disclosure as it appears in the Patent Office file or records, but otherwise reserves all copyright rights whatsoever.

As seen in FIGS. 1 and 4-6, camera 50 is of a conventional digital type with a viewing window 51 (e.g. a LCD screen) for the user, front lens 52, and a plurality of camera function members generally identified as 53 and flash unit 54 (e.g.

flash and red-eye reduction LED). Camera function members 53 include buttons to depress (e.g. shutter button, power button, four-way toggle) and members to rotate or slide (e.g. dial switch, jog dial, slider).

Figure 5:
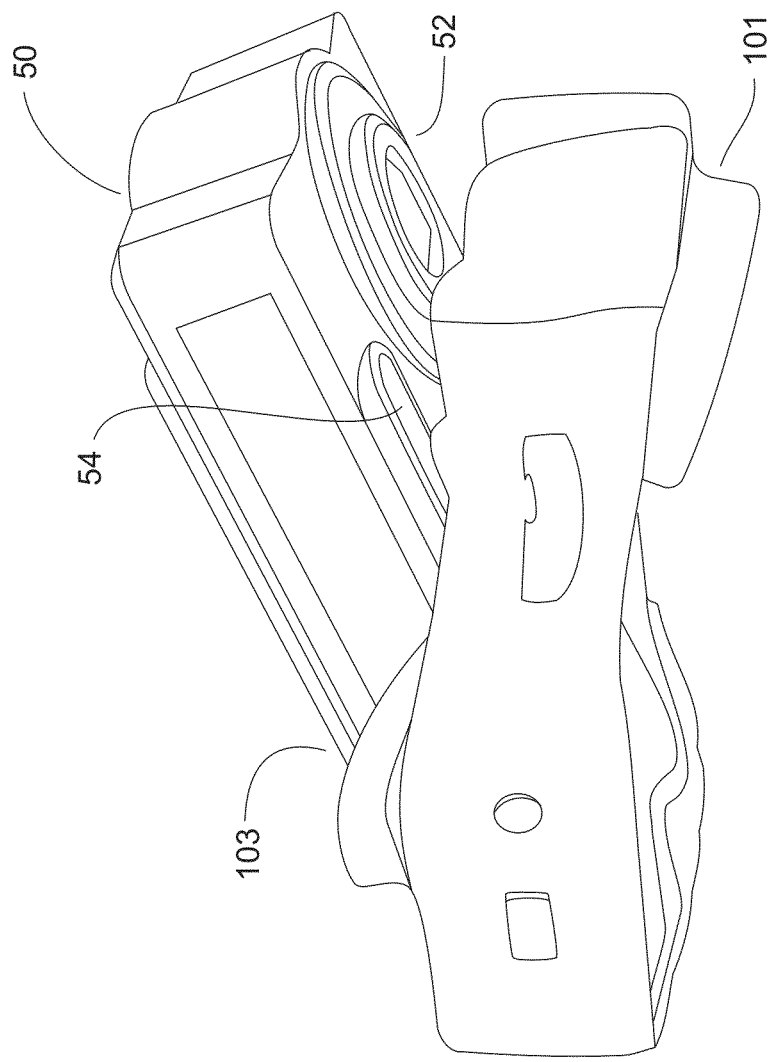
FIG. 5 is a perspective view of the camera partially inserted into the skin.
Figure 6:
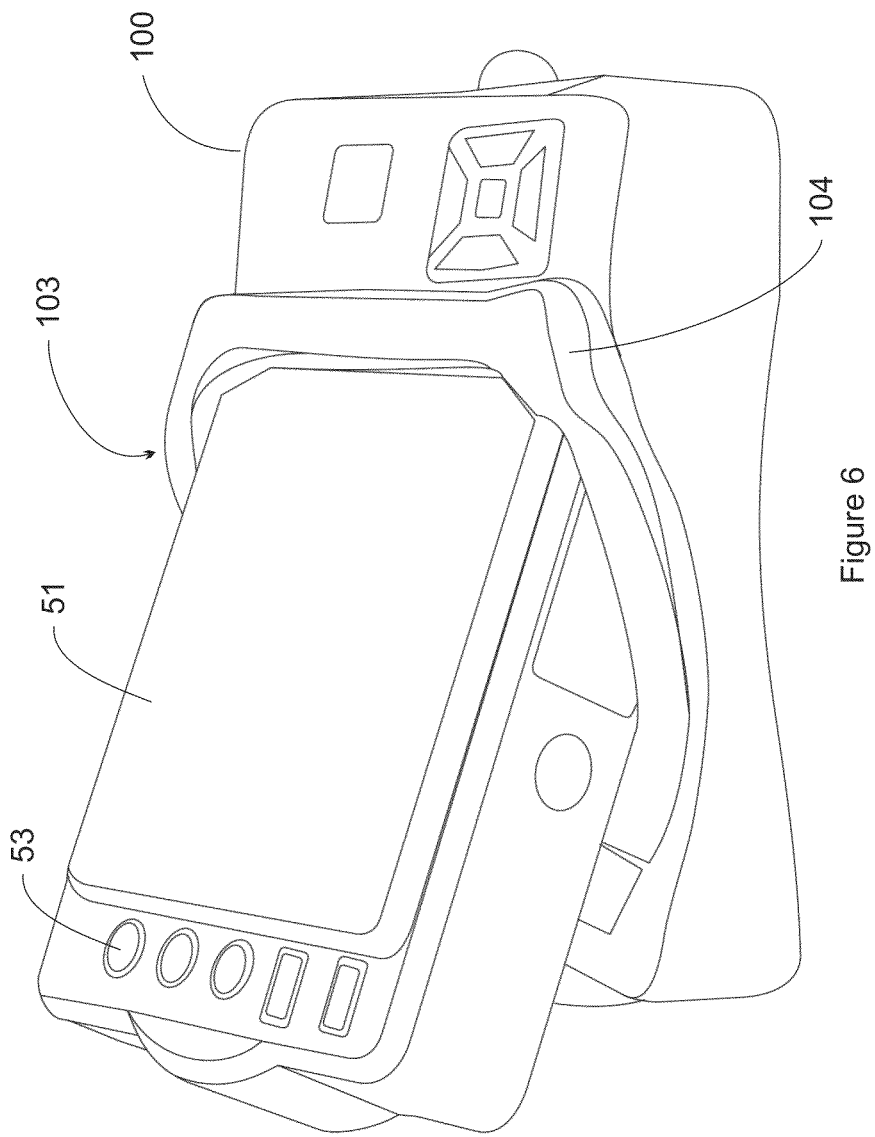
FIG. 6 is another perspective view of the camera partially inserted into the skin.
Figure 7:
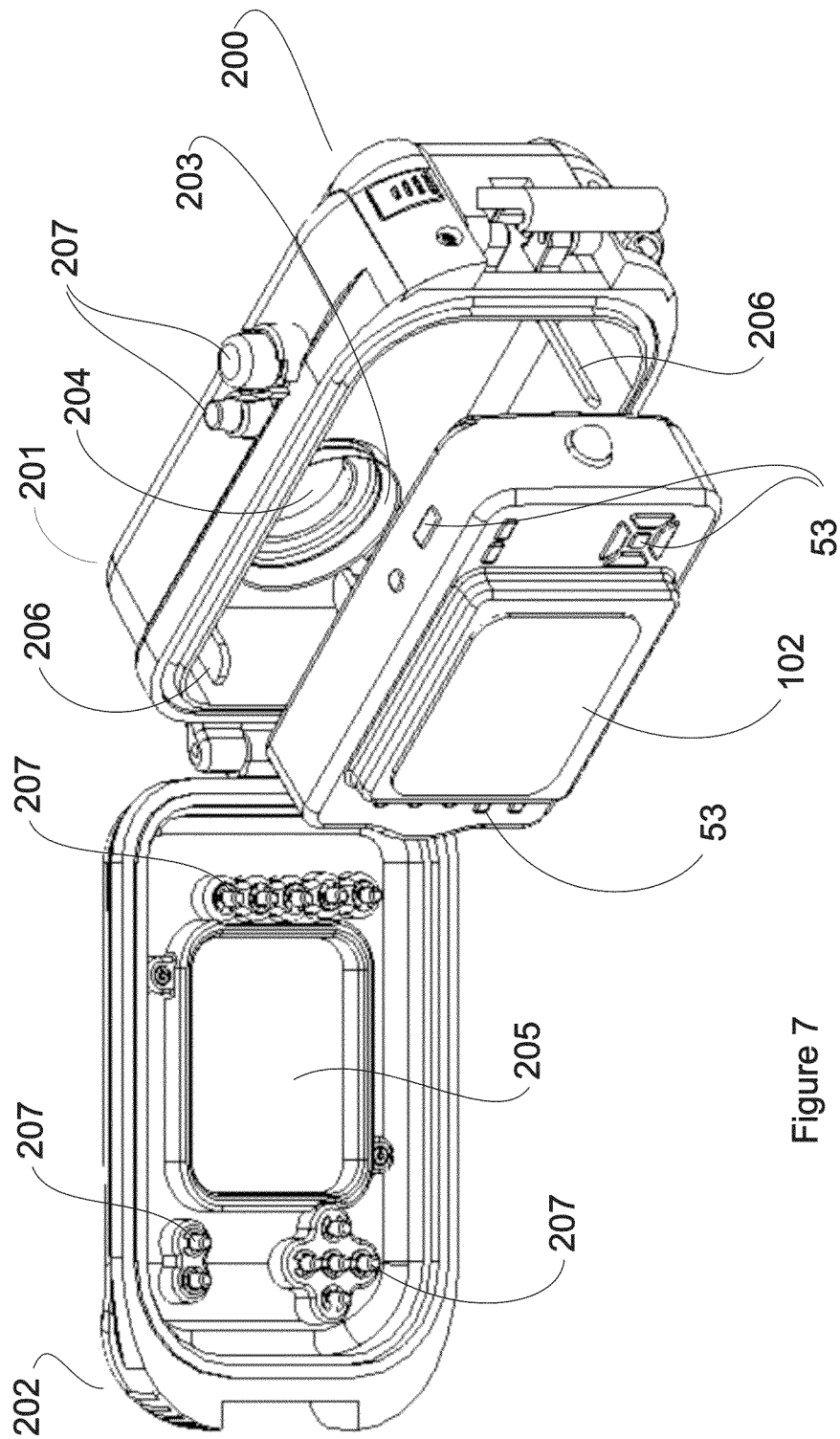
FIG. 7 is a back perspective view of the skin-encased camera about to be inserted into its housing.
Figure 8:
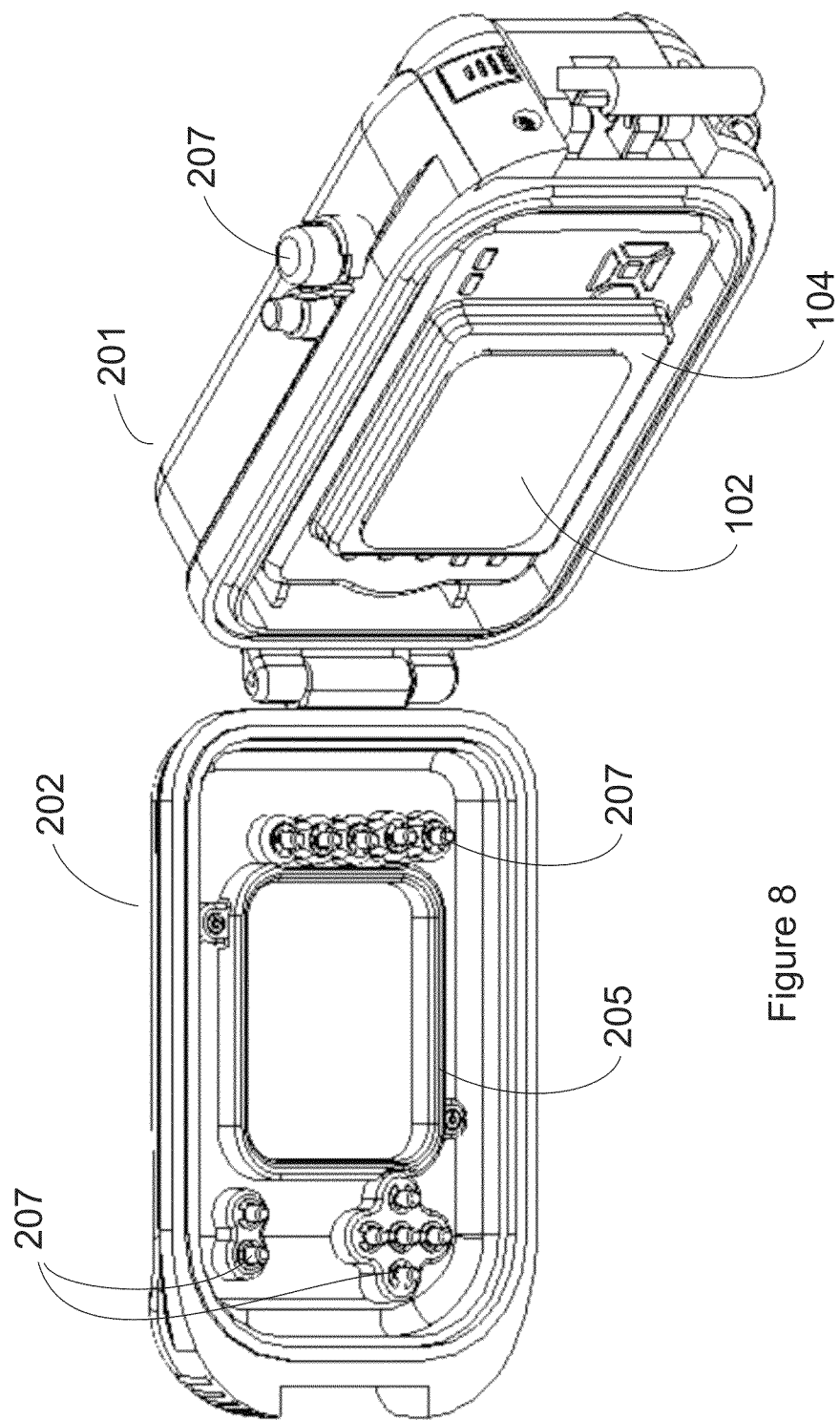
FIG. 8 is a back perspective view of the skin-encased camera inserted into the front portion of its housing.

As seen in FIGS. 1-8, skin 100 is molded to provide a snug, form-fitting, "second skin" for encasing digital camera 50. Skin 100 is made of a synthetic, water-proof material (e.g. silicon rubber) and provides to camera 50 waterproofing and protection against sand, dirt, scratches. Skin 100 also provides to camera 50 (by itself or within housing 200, explained below) absorptive cushioning against minor impacts. Camera 50 fitted with skin 100 (as shown in FIGS. 7-8) is considered to be "skin-encased" and will be termed herein as an "encased camera".

All the contours of camera 50 (e.g. finger grips, front lens 52, plurality of function members 53) are accommodated by skin 100 in a snug fit. Skin 100 is slightly thicker in some places (e.g. contour 104, explained below) and is sufficiently thin elsewhere to permit easy manipulation by the user of all key camera function members 53 by pressing the corresponding portion of skin 100 (and also by manipulation of, for example, spring-loaded buttons in another embodiment of this invention, as described below). Most clearly shown in FIGS. 2-3, portions of skin 100 may be raised slightly to accommodate camera function members which protrude slightly from camera 50.

Skin 100 has semi-rigid or rigid lens port 101 with tempered glass, to accommodate front lens 52 of camera 50 when encased.

Skin 100 has a clear (e.g. acrylic) plate 102 that is positioned so as to provide the user a clear view of camera viewing window 51 when camera 50 is encased.

Figure 2:
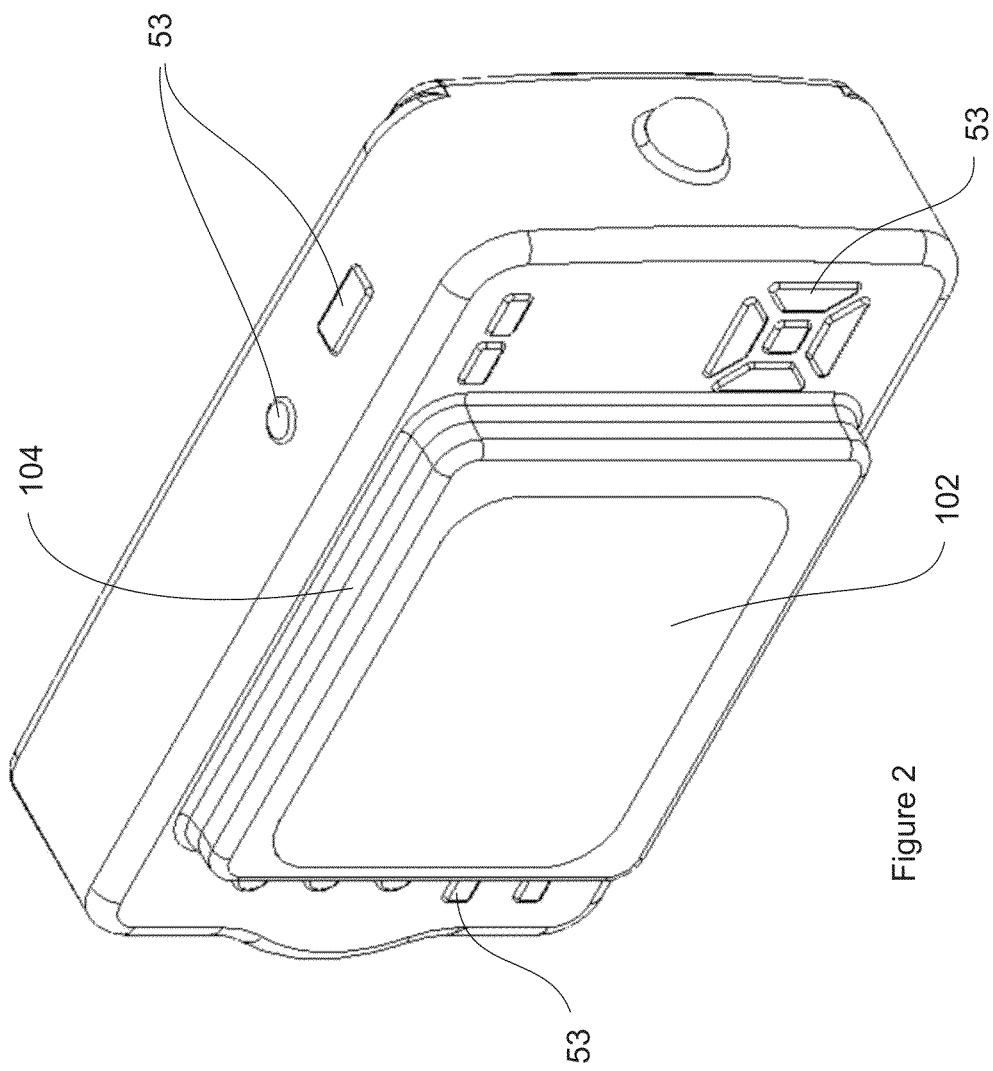
FIG. 2 is a back perspective view of the skin of FIG. 1.
Figure 3:
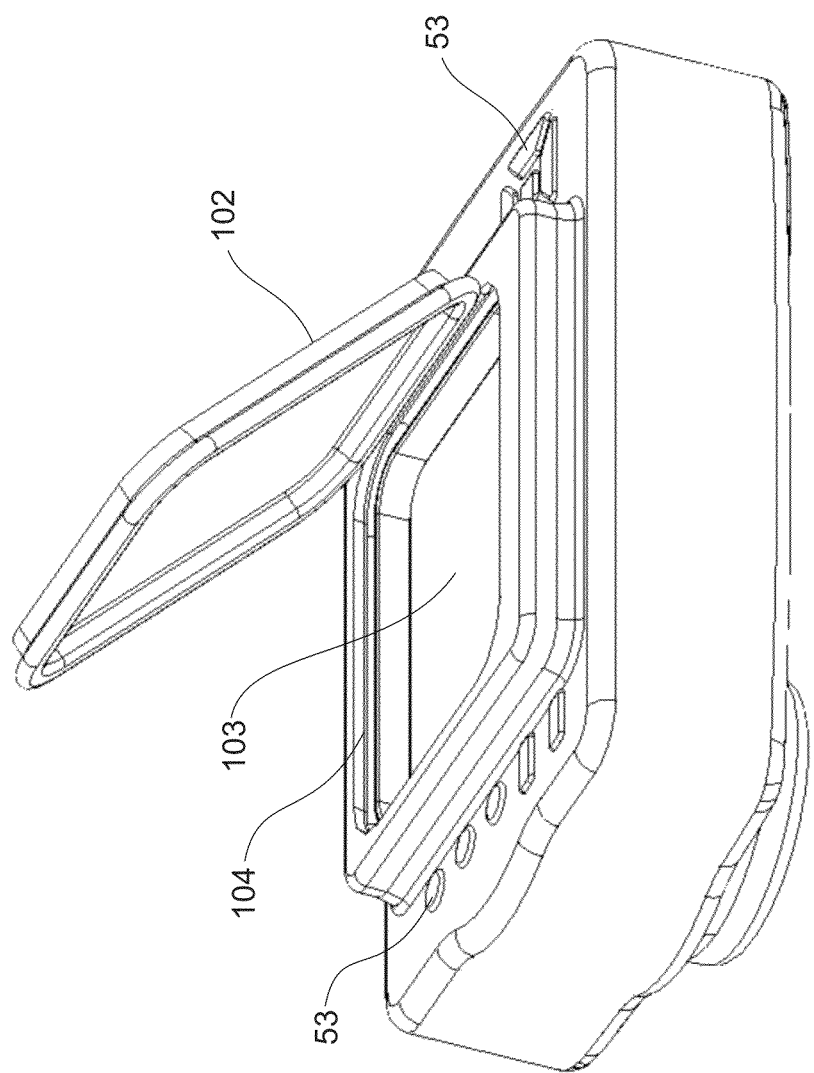
FIG. 3 is a back perspective view of the skin with the back plate removed.
Figure 4:
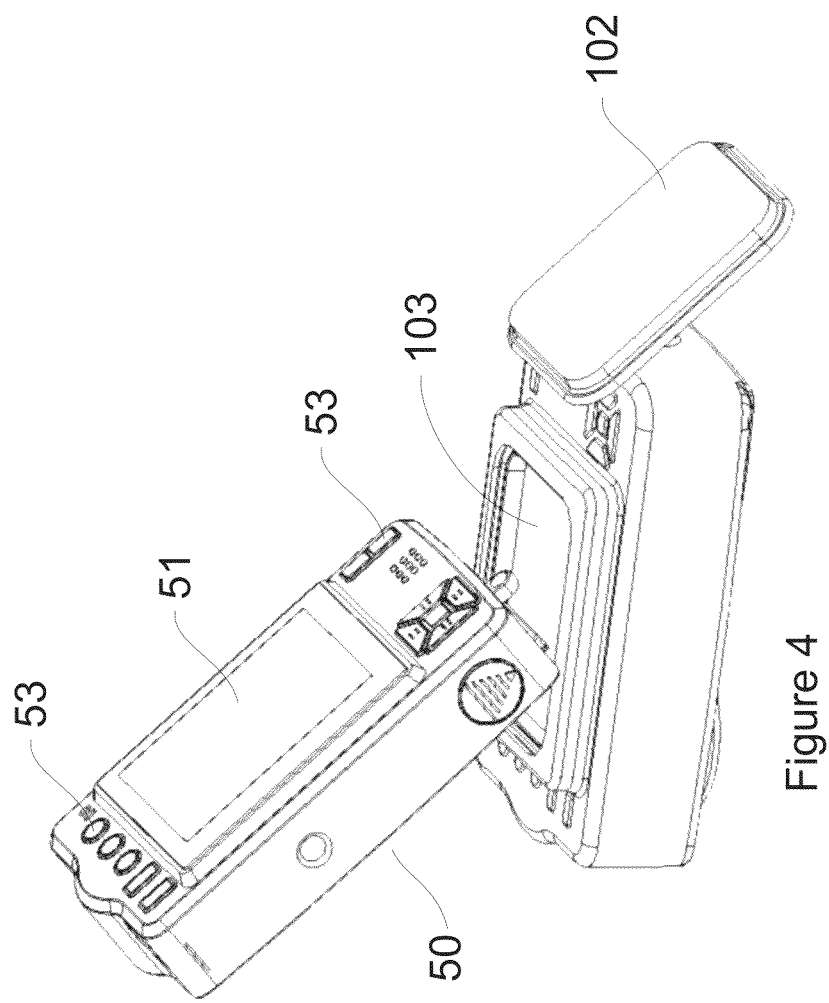
FIG. 4 is a back perspective view with a camera to be inserted into the skin.

Skin 100 has a hole 103 defined by a double-lipped, grooved contour 104 (best seen in FIG. 3) that insertably (and also removably) accepts and holds plate 102 into a water-tight friction fit, as seen in FIG. 2. Plate 102 and associated contoured hole 103 are dimensioned at least to permit the user a complete view of camera viewing window 51. Furthermore, plate 102 (and associated hole 103) should be of a size sufficient to permit camera 50 to be inserted therethrough completely so that camera 50 can be snugly fitted completely by skin 100 as a "second skin", much like a diver dons a wetsuit, as seen in FIGS. 4-6). The "second skin" 100 can be removed (i.e. camera 50 is "un-encased") by the reverse process, i.e. removing plate 102 from contoured hole 103, and then removing camera 50 through hole 103.

Skin 100 is made conventionally (by injection or compression molding) from conventional materials such as silicon rubber or other synthetic material of like properties. The average thickness of skin 100 is about 1.5 millimeters but as mentioned above, is thicker in some places and thinner in other places. Skin 100 must be flexible enough to permit (through pulling and stretching, as shown in FIGS. 5-6), the insertion of camera 50 into skin 100 through hole 103 and subsequent manual manipulation of camera 50 relative to skin 100 to conclude with the snugly fitting "second skin", as described above.

Skin 100 may be transparent, translucent or coloured as desired (conventionally through the application of pigments in the skin molding process), with two advantageous exceptions. First, as seen in FIG. 1, skin 100 has a clear portion 105 for a flash from camera flash unit 54. Secondly, skin 100 is darkened around lens port 101 (as seen in FIG. 1, and not in other drawings for simplicity of presentation therein) to block the light that would otherwise travel from flash unit 54 through skin 100 and adversely affect the intake of light through camera lens 52.

Encased camera 50 is usable with aforementioned protections (against sand, dirt, scratching, moisture and like traumas) in a wide range of environments (e.g. in rough terrain or shallow water). For diving to greater depths with encased camera 50, there is provided rugged housing 200, as seen in FIGS. 7 and 8. Housing is made of two shells or portions 201 (front) and 202 (back), hinged on one side and clampable tightly by conventional buckle-type clamping fasteners at the other side. Each shell 201 and 202 can be formed as a molded product of synthetic resin (e.g. polycarbonate) or other synthetic material that is impermeable to water and resistant to pressure. Conventional O-ring or other sealing mechanisms are provided with shells 201 and 202 so as to define a water-free space for encased camera 50 when shells 201 and 202 are clamped closed.

Shell 201 has lens port 204 to accommodate lens port 101 of encased camera 50. Lens port 204 has an interior (of housing 200), inwardly and slightly opening cylindrical, semi-rigid plastic cowl or hood 203, as seen in FIG. 7. Hood 203 gently guides and accepts lens port 101 of encased camera 50 when front and back shells 201 and 202 are clamped closed. Hood 203 is dark to block light from camera flash unit 54 traveling through/along shell 201 of housing 200 if housing 200 is translucent or transparent, again to prevent adverse effects of such light on the proper intake of light into camera front lens 52. Hood 203 also assists in the moisture-sealing about lens port 101 when encased camera 50 is within clamped housing 200, by providing a plastic, sealing cushion for lens port 101 to abut against.

Shell 202 has an internal rectangular plastic ring or presser 205 positioned so that when encased camera 50 is placed within housing 200 and back shell 202 is clamped to front shell 201, presser 205 presses the perimeter of grooved contour 104 for urging a water-tight fit of plate 102 relative to hole 103.

As seen in FIGS. 7 and 8, webbing 206 and other infrastructures within housing 200 snugly receive, align and hold properly encased camera 50 relative to hood 203 and lens port 204, and relative to camera function actuators 207 (explained below).

The exterior of housing 200 has heavy-duty corner bumpers, finger/hand gripping surfaces for the ease of the diver, and other conventional members (not shown for simplicity of presentation in the drawings).

Camera function members 53 which are a depressible button have a corresponding actuator button 207 fitted on housing 200, conventionally springloaded and sealed against water intrusion, and perhaps ergonomically advantageous (e.g. oversized) for use by a diver underwater.

Figure 9:
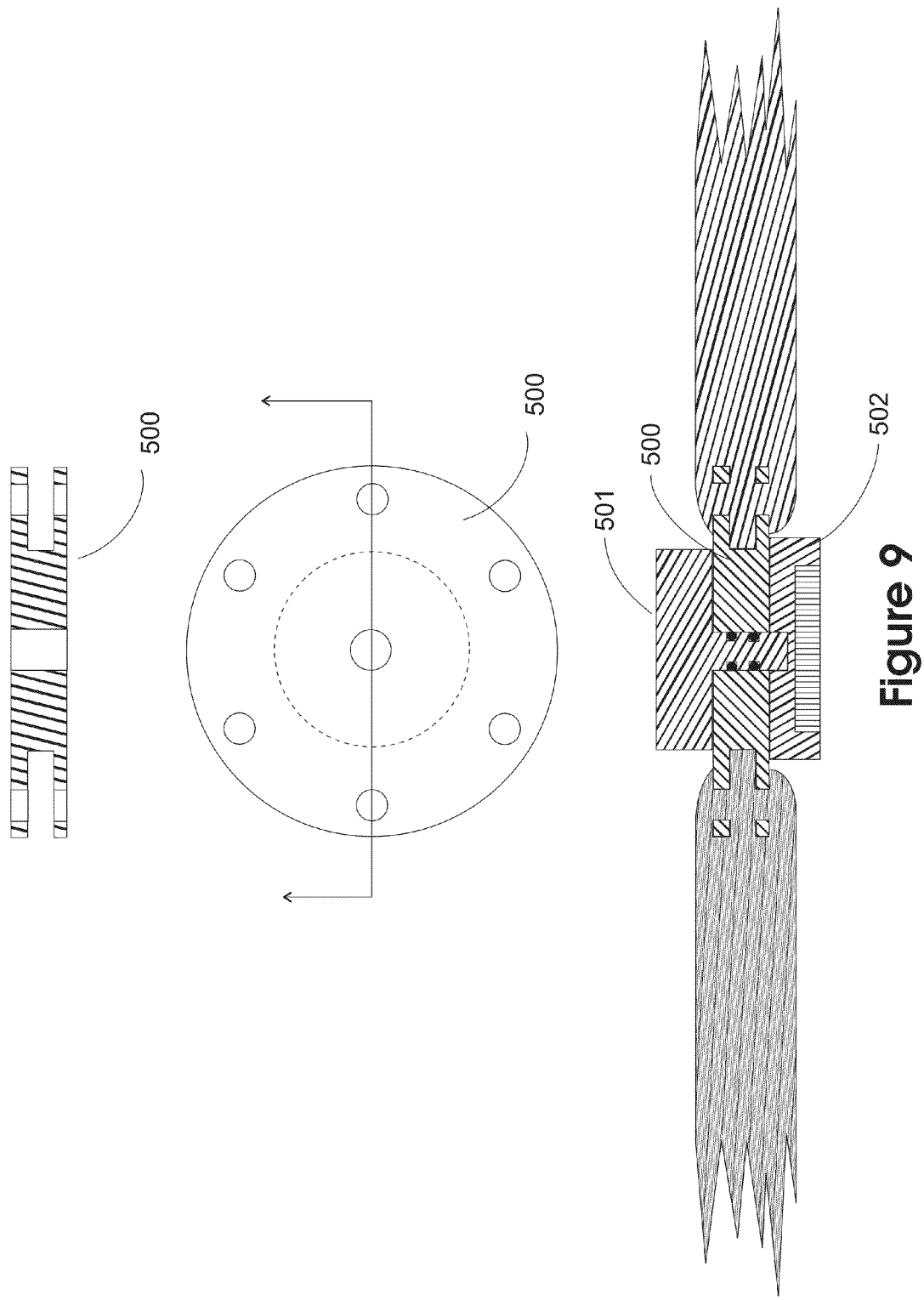
FIG. 9 is three views of a spacer and dial actuator fitted within the skin.

Camera function members 53 which are rotatable (e.g. dial) are rotated by the diver with following actuator. As seen in FIG. 9 (but not shown in the other drawings of skin 100 for simplicity of presentation), spacer 500 is lodged within skin 100, and rotatably houses a combination of external turning wheel 501 attached to internal cap 502 that friction fits against a dial button (not shown) of encased camera 50. Wheel and cap combination 501 and 502 are made of metal, stiff rubber or similar sufficiently rigid material.

Figure 10:
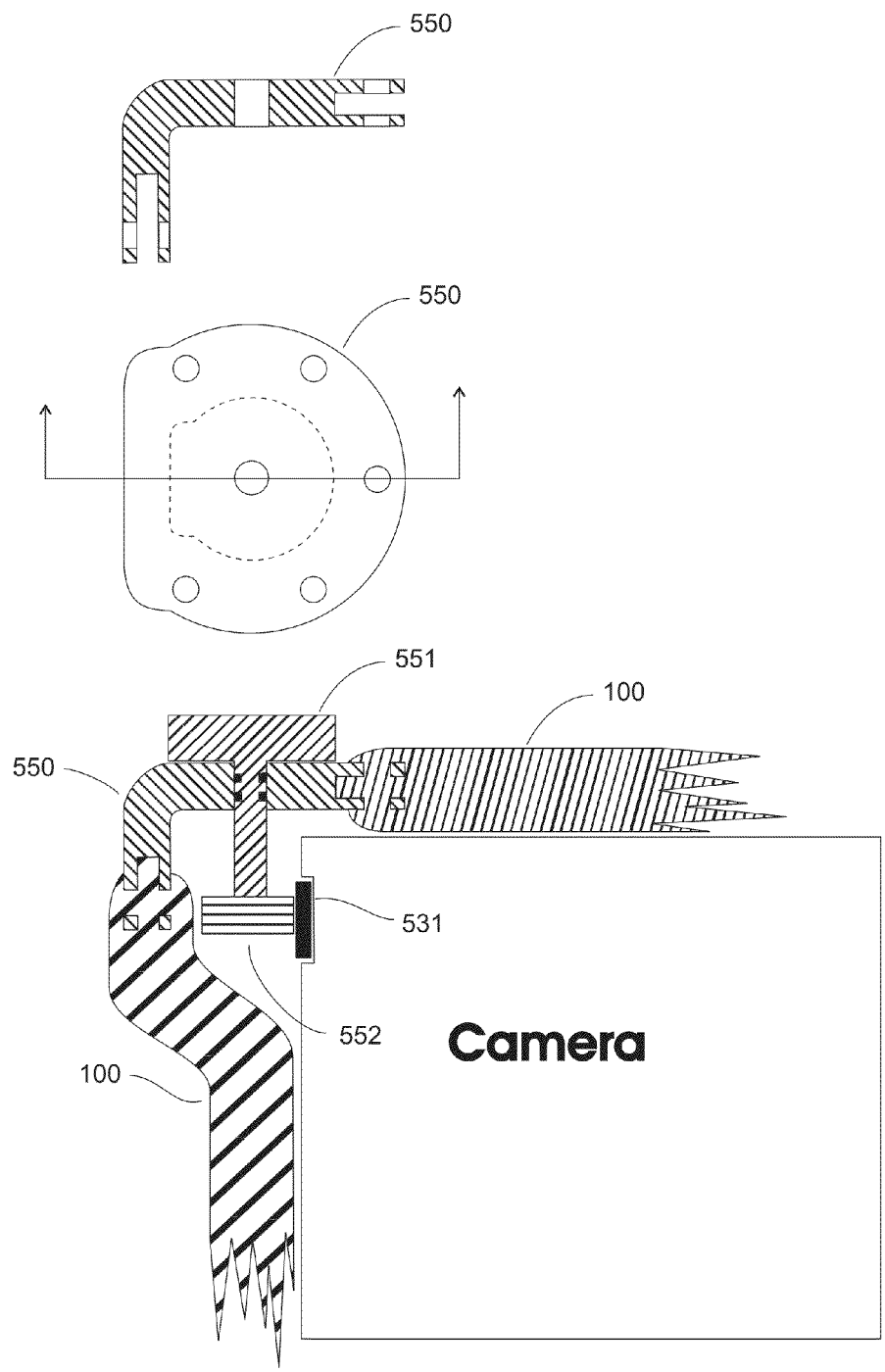
FIG. 10 is three views of a spacer and slide actuator fitted within the skin.

Camera function members 53 which are slidable, are slid by the diver with following actuator. As seen in FIG. 10 (but not shown in the other drawings of skin 100 for simplicity of presentation), spacer 550 is lodged at the corner of the top and side portions of skin 100 proximate a slide dial 531 of camera 50. Spacer 550 rotatably supports an external turning wheel 551 which turns a friction wheel 552 that abuts slide dial of 531 and laterally moves slide dial 531 in a pinion style interaction when wheel 551 is turned by the user.

Spacers 500 and 550 are "insert molded" into skin 100 as it itself is being molded. Spacers 500 and 550 can be made of metal or non-metallic material (such as thermoset plastic) as long as that material retains its shape (e.g. does not melt) in the temperature range that the silicon rubber is being molded. To make skin 100. The support provided by spacers 500 and 550 includes O-rings and other conventional mechanisms to resist water leakage.

Herein above, reference has been made to a "digital camera", and a typical camera in terms of "form factor" representation has been illustrated in the Figures. This invention (and in particular, the skin and the housing thereof), are customizable to a wide range of cameras. Nothing herein is meant to limit this invention to a digital camera for still shots. For example, video cameras (or those having both still picture and video functionality) are within the teachings and spirit of this invention. Furthermore, skin 100 can be adapted for a wide range of cameras where the camera function members are operated by a depression, rotation or sliding movement. There might be some limitations for a camera where a very substantial projection must be accommodated (e.g. flash unit that pops up substantially or a lever switch that swings out substantially from the camera). But in these cases, skin 100 can be adapted to have a rigid or semirigid structure to accommodate the projection (e.g. along the lines of skin lens port 204 for lens port 101 of camera front lens 52).

One example of aforementioned adaptation is for cameras equipped with a zoom version of front lens 51. Skin 100 lens port 204 can be adapted by equipping it with a silicon skin bellows to surround the projected front lens 51 (not shown for simplicity of illustration) and which expands from an initial rest position and contracts, in response to the projection or retraction of the zoom lens. Plate 102 made be of glass or transparent plastic but also may be made conventionally to provide a small magnification for the ease of the diver relative to camera viewing window 51.

Without skin 100, a camera within a housing like housing 200, would suffer from condensation and consequent damage to the electronics of the camera. Skin 100 provides protection against moisture condensation within housing 200.

As explained above, a skin can be adapted for a wide range of cameras of differing contours but there might be some limitations for a camera having a substantial projection to be accommodated. One particular, substantial projection—the zoom lens of the camera—invites special attention.

For many cameras, the skin can be adapted to have a rigid or semi-rigid structure to accommodate the zoom lens. Following the principles embodied in the example lens port 101 for camera 50 (shown in FIG. 1), skin 900 will be explained in conjunction with FIGS. 16-17. But for some cameras whose zoom lens is very large or shaped unusually, the requisite adaptation of the skin may be difficult or costly to manufacture. This situation is addressed by a further embodiment of the skin explained in conjunction with FIGS. 11-15. For both of those size of cameras, a lens protector can be advantageously employed, as explained below. All cameras mentioned below differ between themselves and from camera 50 only in form factor (size, contours, actuator buttons and the like). For simplicity of illustration, not all features of such cameras will be illustrated and identified but essentially, all cameras have a lens, a viewing window or similar mechanism for the user, actuator functionality (e.g. slide knobs, push buttons and the like) and optionally a flash unit.

Lens protector 600, skin 700 and associated camera 800 with large zoom lens 801, are described in conjunction with FIGS. 11-15.

Figure 11:
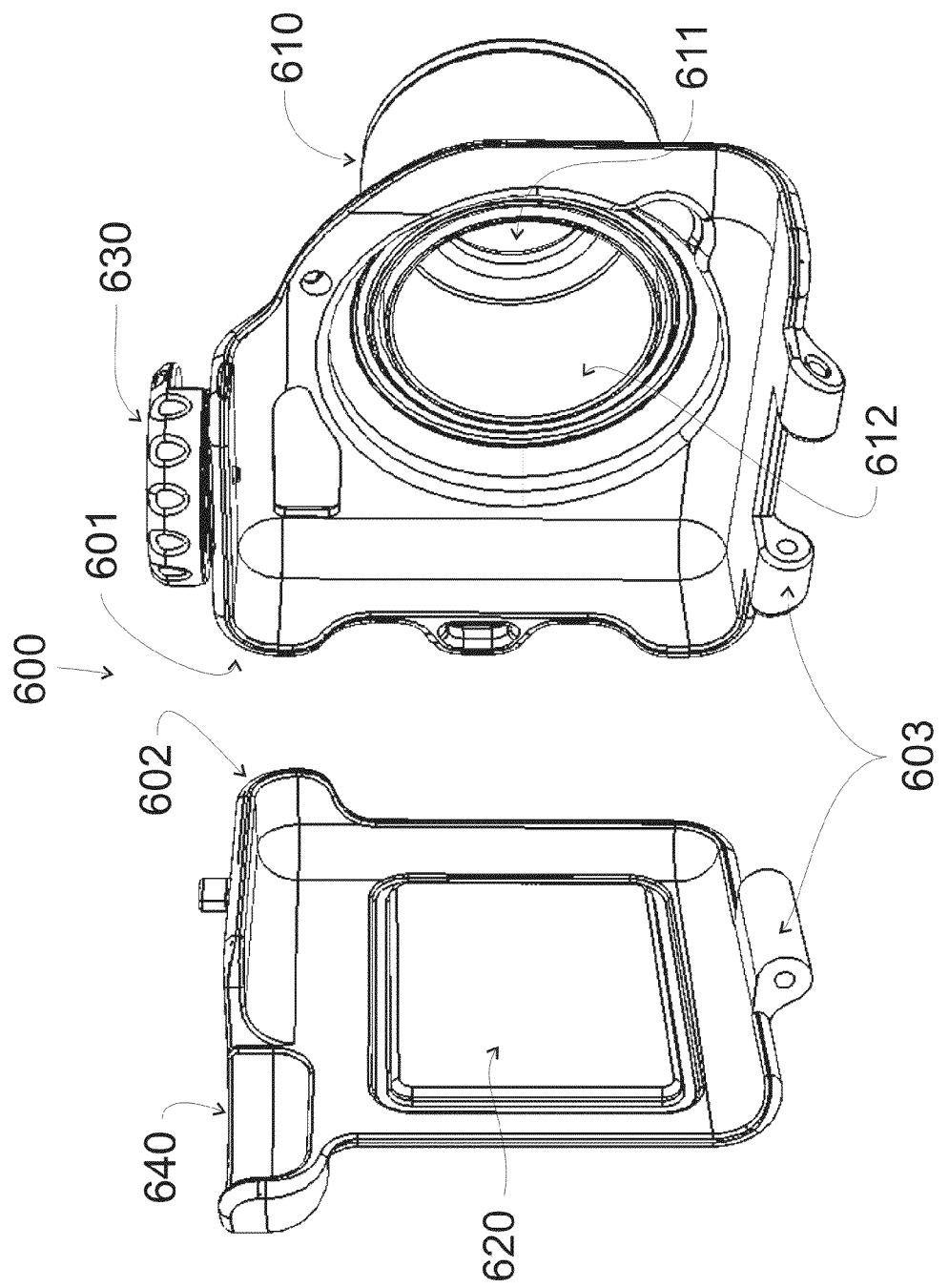
FIG. 11 is a dis-assembled perspective view of the lens protector.
Figure 12:
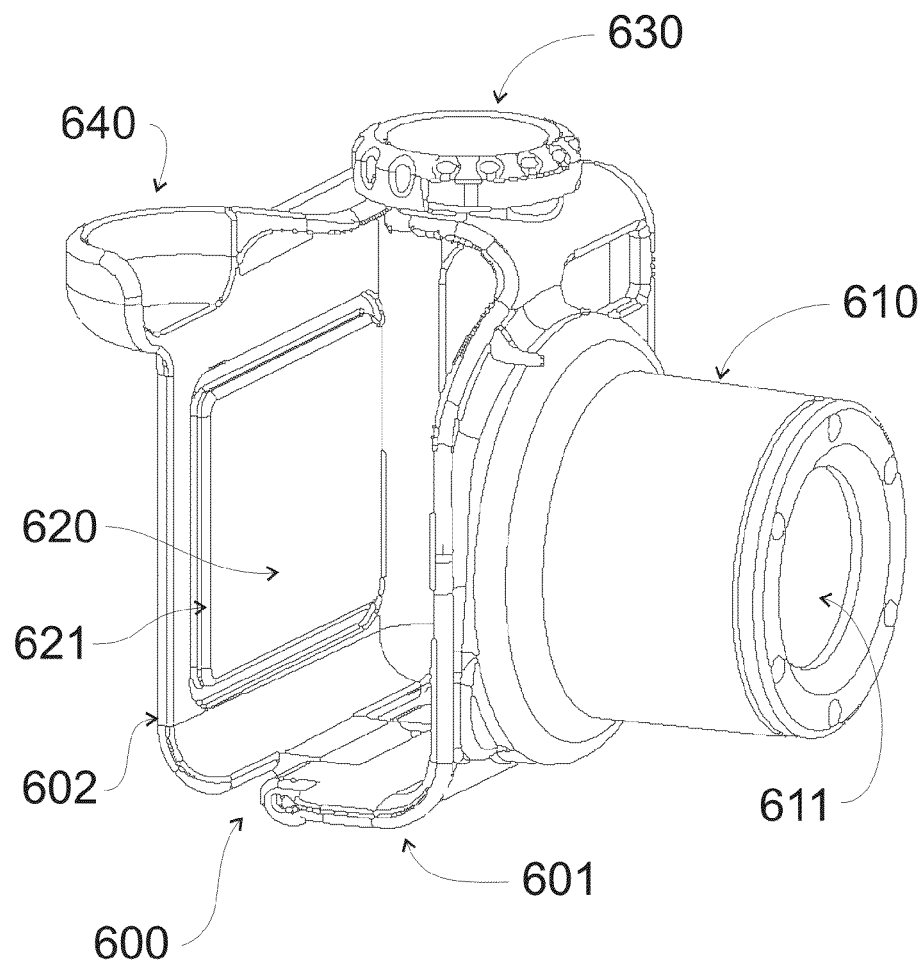
FIG. 12 is the assembled view of the lens protector of FIG. 11.

As seen in FIGS. 11 and 12, rigid lens protector 600 resembles a partial version of housing 200. Lens protector 600 is formed by front shell 601 (with lens port 610) and back shell 602, respectively corresponding roughly to the front and back of camera 800. Front and back shells 601 and 602 are hinged at the bottom by a conventional pin mechanism and are secured at the top by conventional releasably lock 630 (e.g. rotatable lock mechanism) for creating, when closed like a shell, a water-resistant seal about camera 800 encased by skin 700 (explained below).

Although lens protector 600 resembles housing 200 in form and function (e.g. rigid lens port 610 provides protection to the zoom lens 801 against mechanical traumas like knocks and scrapes), one major difference is that front and back shells 601 and 602 are contoured to snugly accept (part of) front and back portions of camera 800 encased in skin 700. In other words, there is no internal space intended between (part of) skin-encased camera 800 and the inside surface of lens protector 600. The portion of the skin-encased camera 800 that is not protected by lens protector 600, is available for gripping by the user and still enjoys protection against environmental traumas explained above. Front shell 601 is contoured with a lens port 610 to receive the zoom lens 801 of camera 800 (and resembles lens port 204 of housing 200 for camera 50 as shown in FIG. 7). Lens port 610 has tempered glass 611 to align with the camera zoom lens 801. Lens port 610 may be darkened to act as a light shield. For example, there may be internal hood 612 made of a soft, inner lining of black thermal plastic resin, that prevents the light of a flash of camera 800, from contacting and spreading along skin 700 proximate the camera zoom lens 801 and spoiling the picture taken (whose principles were explained above in conjunction with darkened hood 203 and lens port 101 for camera 50).

Back shell 602 is contoured with a transparent plate 620 to align with viewing window (not shown) of camera 800. Actuator functions (e.g. dial knobs) and other projections of camera 800 are accommodated by lens protector 600 and symbolized in FIGS. 11-12 at 640.

Details of the pin mechanism, locks, fasteners and sealing mechanisms interconnecting front and back shells 601 and 602, are not shown in detail for simplicity of illustration. As with housing 200, any conventional mechanisms known to those in the art, are acceptable (for examples, hinges, buckle fasteners, rotatable locks, O-rings) as long as front and back shells 601 and 602 close in a water-resistant seal about skin-encased camera 800. The internal contours of front and back shells 601 and 602 generally follow the external contours of skin 700 when it encases camera 800. In particular, the portion of lens protector back shell 602 about transparent plate 620, the portion of lens protector front shell 601 proximate the base of lens port 610, and the portions of skin 700 correspondingly aligned thereto when lens protector 600 is tightly closed about camera 800, are each contoured so as to create a tight water-resistant seal when lens protector 600 is tightly closed about skin-encased camera 800, in order to prevent moisture from entering aforementioned holes. In particular, back shell 602 has an internal rectangular plastic ring or presser 621 positioned so that when lens protector 600 is closed tightly about the skin-encased camera 800, presser 621 presses the perimeter of grooved contour 713 of skin hole 711 (corresponding to the viewing window of the camera) for urging a water-tight seal therebetween to prevent moisture from entering therethrough. In particular, skin 700 has a circular contour 712 surrounding hole 710 that creates a tight, water-resistant seal with a corresponding internal portion of lens protector front shell 601 (not shown) to prevent any moisture from entering hole 710.

Like housing 200, front and back shells 601 and 602 (and in particular, lens port 610) can be formed as a molded product of synthetic resin (e.g. polycarbonate) or other synthetic material that is impermeable to water and resistant to pressure.

Figure 13:
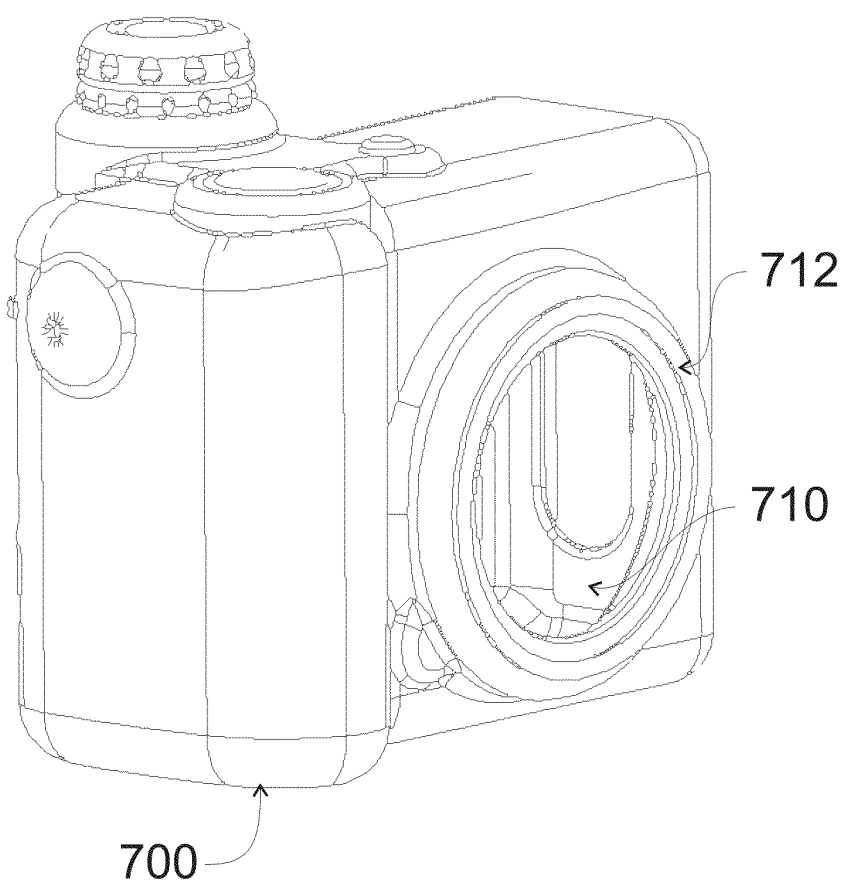
FIG. 13 is the front perspective view of the skin for the camera of FIG. 15.
Figure 14:
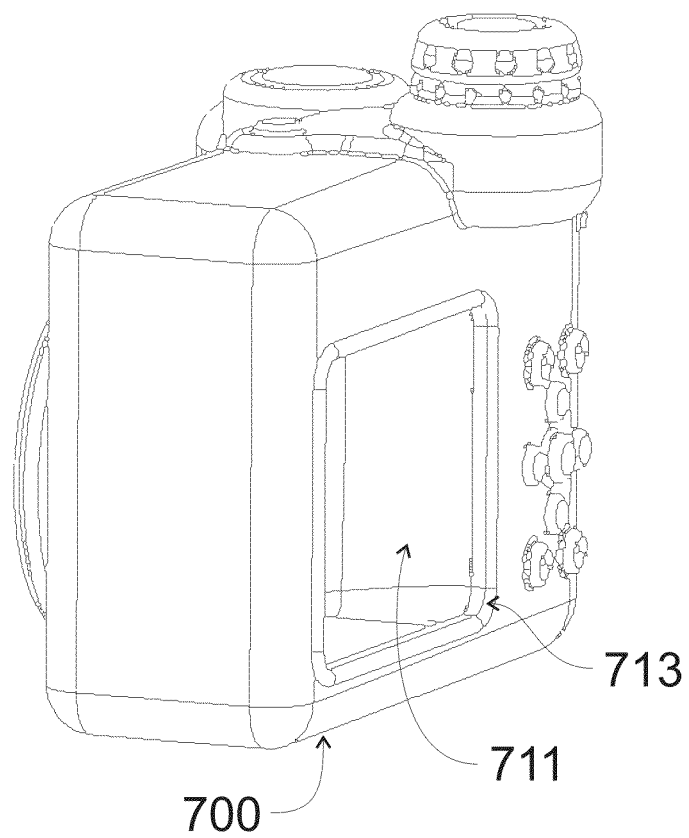
FIG. 14 is the back perspective view of the skin for the camera of FIG. 15.
Figure 15:
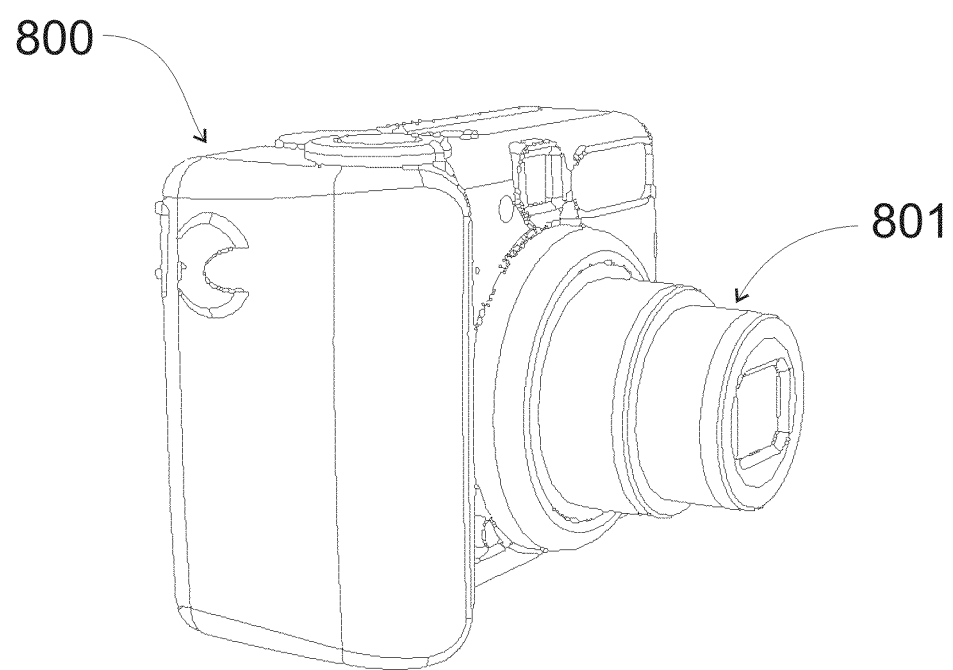
FIG. 15 is a perspective view of the camera associated with the skin and lens protector of FIGS. 11-14.
Figure 16:
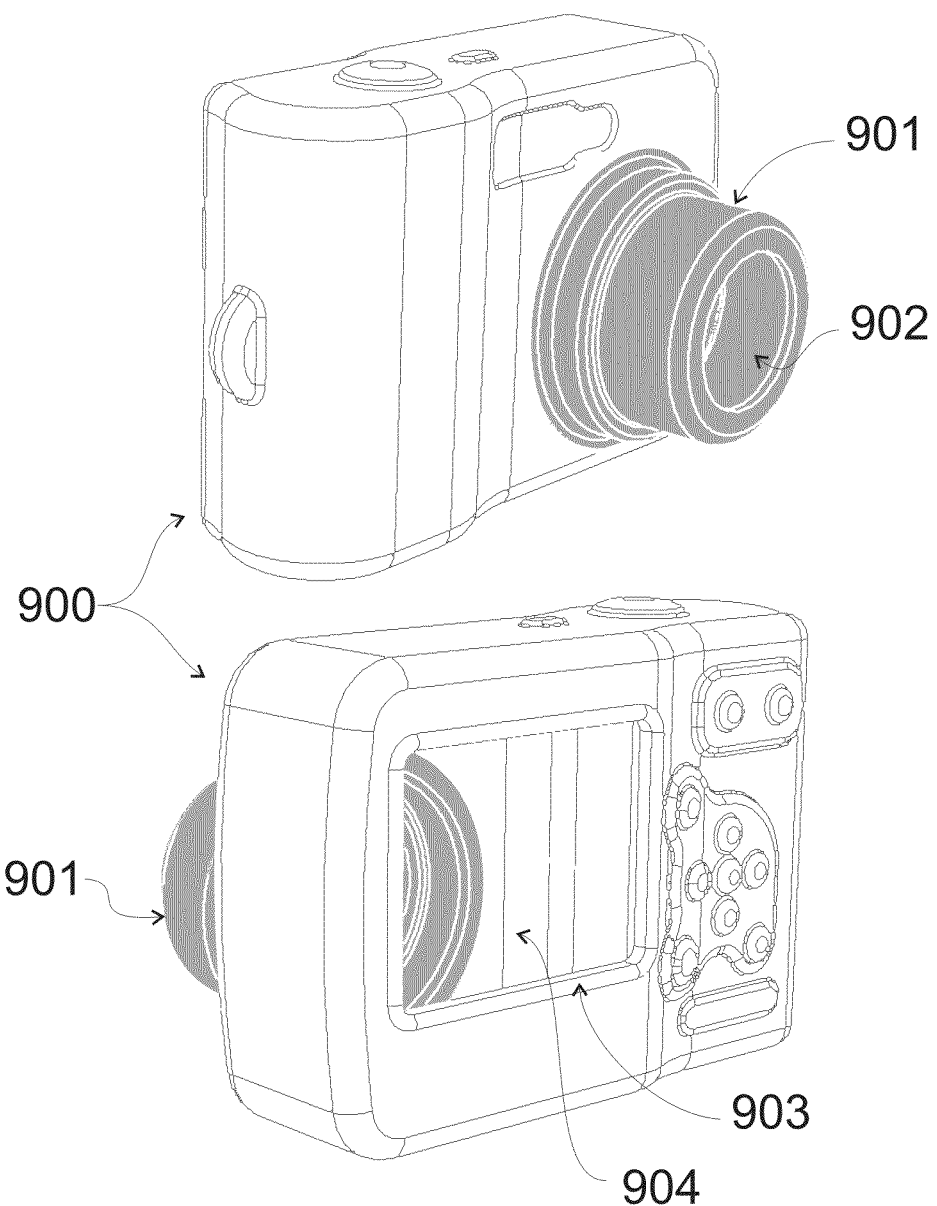
FIG. 16 is a front and back perspective view of another embodiment of the skin for another camera.
Figure 17:
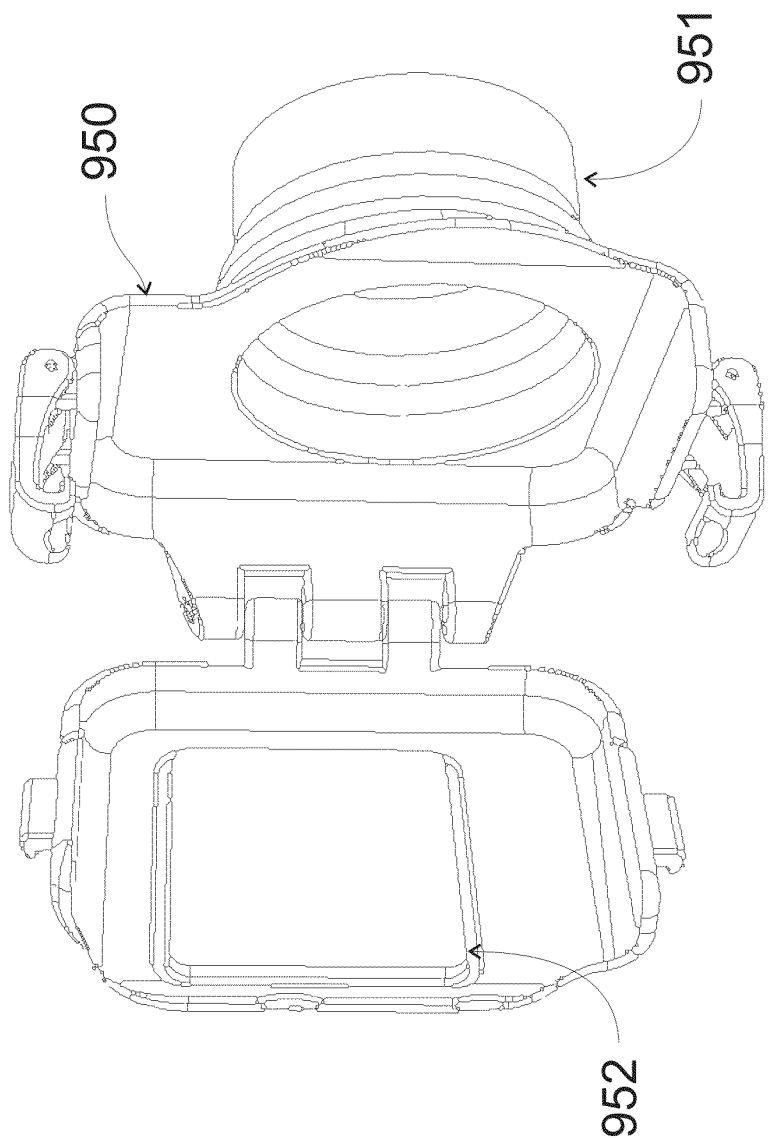
FIG. 17 is a front perspective view of the opened lens protector for the skinencased camera of FIG. 16.

FIGS. 13 and 14 show skin 700 for camera 800. Skin 700 is another example of the "second skin" principles explained above in connection with the embodiment of skin 100 (as described in connection with FIGS. 1-6). Skin 700 is contoured to fit camera 800 of a different form factor than that shown in FIGS. 1-6 but the principles continue to apply. The major difference is that skin 700 has an opening 710 for the zoom lens 801 of camera 800 to extend through freely. Skin 700 has hole 711 profiled and aligned for the viewing window (not shown) of camera 800. With reference to FIGS. 16-17, for a camera (not shown) whose zoom lens is not so difficult or costly to manufacture a "second skin" for, a variation is shown in lens protector 950 with clear (i.e. not darkened) lens port 951 that is a through hole for lens port 901 to extend through. Skin 900 resembles skin 100 (described above in conjunction with FIGS. 1-6) but, for accommodating the large zoom lens, has a very extended and darkened lens port 901 (resembling lens port 101 of skin 100) that terminates with tempered glass 902 in a water-tight configuration. When the encased camera is assembled with the lens protector 950, the tempered glass 902 is exposed to the environment. Lens protector 950 has an internal rectangular plastic ring or presser 952 positioned so that when lens protector 950 is closed tightly about the camera, presser 952 presses the perimeter of grooved contour 903 of skin hole 904 (corresponding to the viewing window of the camera) for urging a water-tight seal therebetween to prevent moisture from entering hole 904.

Although one particular, substantial projection—the zoom lens of the camera—has been addressed above, this invention should not be limited thereto. The principles of mechanical protection against traumas, water-resistant seal and others described above, may be applied to other large projections extending from the camera or other underwater device.

Furthermore, the above principles of protection against traumas (mechanical and environmental factors like moisture and dust) may be advantageously applied to handheld electronic devices other than digital cameras. Protection will be described below for, as examples, cell phones (in conjunction with FIGS. 18-20) and portable electronic games (in conjunction with FIGS. 21-23).

Figure 19:
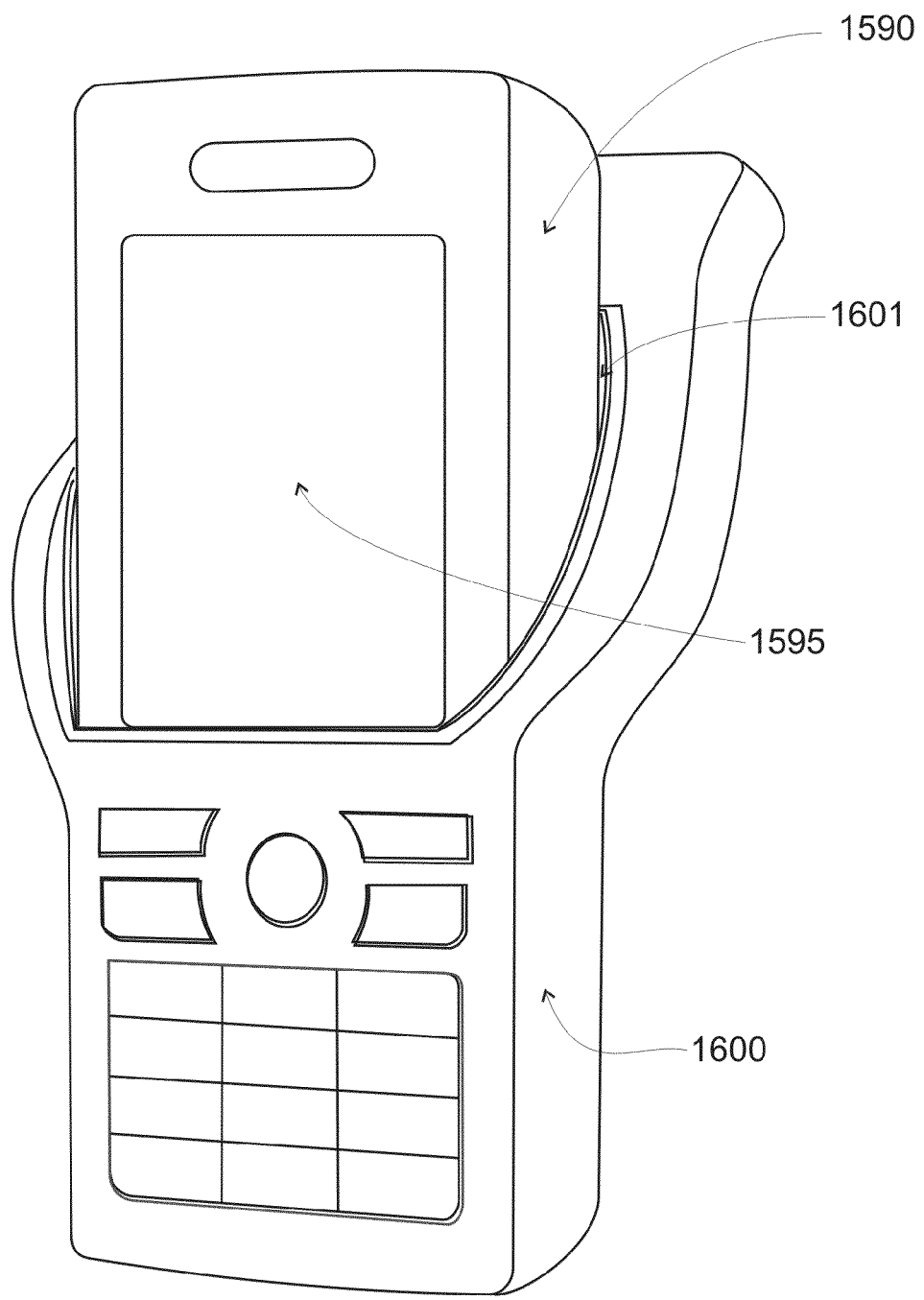

FIG. 19 shows a typical form factor for cell phone 1590 (with keypad and other control buttons), and display 1595 (e.g. a viewing window or screen implemented as a LCD display).

As shown in FIG. 18, skin 1600 is identical to skin 100 (for digital cameras, as described above in conjunction with FIGS. 1-17) in attributes, material and function, except that it is contoured for snug encasement of cell phone 1590 and its form factor (with keypad and other control buttons, and display 1595). As with the digital camera above, cell phone 1590 fitted with skin 1600 (as shown in FIG. 20) is described herein as "skin-encased" or "encased".

Skin 1600 provides a complete water-tight, cushioned wrapper of cell phone 1590, with the exception of skin hole 1601. Skin hole 1601 is positioned in skin 1600 to align (for user's viewing) with cell phone display 1595 when cell phone 1590 is encased by skin 1600 as shown in FIGS. 19 and 20. Skin hole 1601 is defined and dimensioned sufficiently for cell phone 1590 to be inserted therethrough (as shown in FIG. 19), and afterwards, skin 1600 is adjusted and manipulated manually, much as a diver dons a wetsuit, to encase cell phone 1590.

Figure 18A:
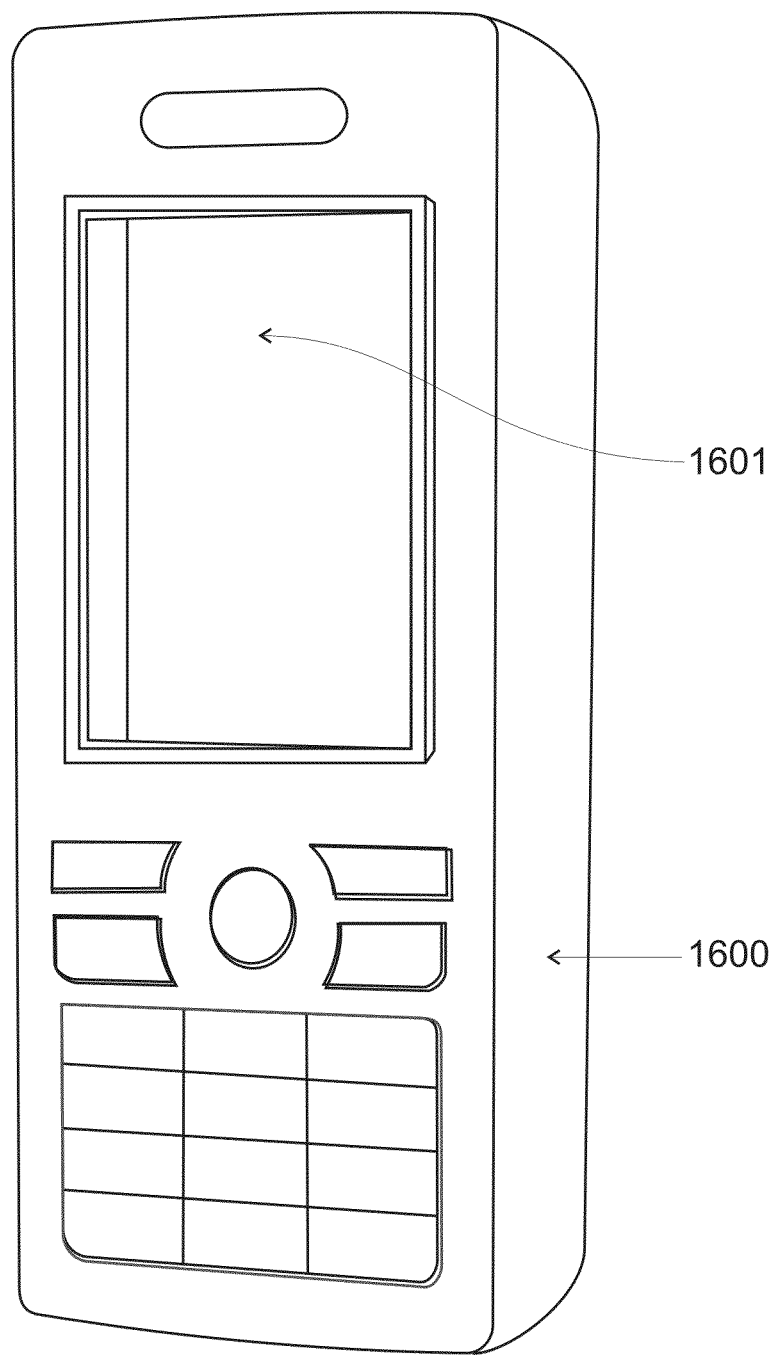
FIG. 18a is a front perspective view of a skin for a cell phone.
Figure 18B:
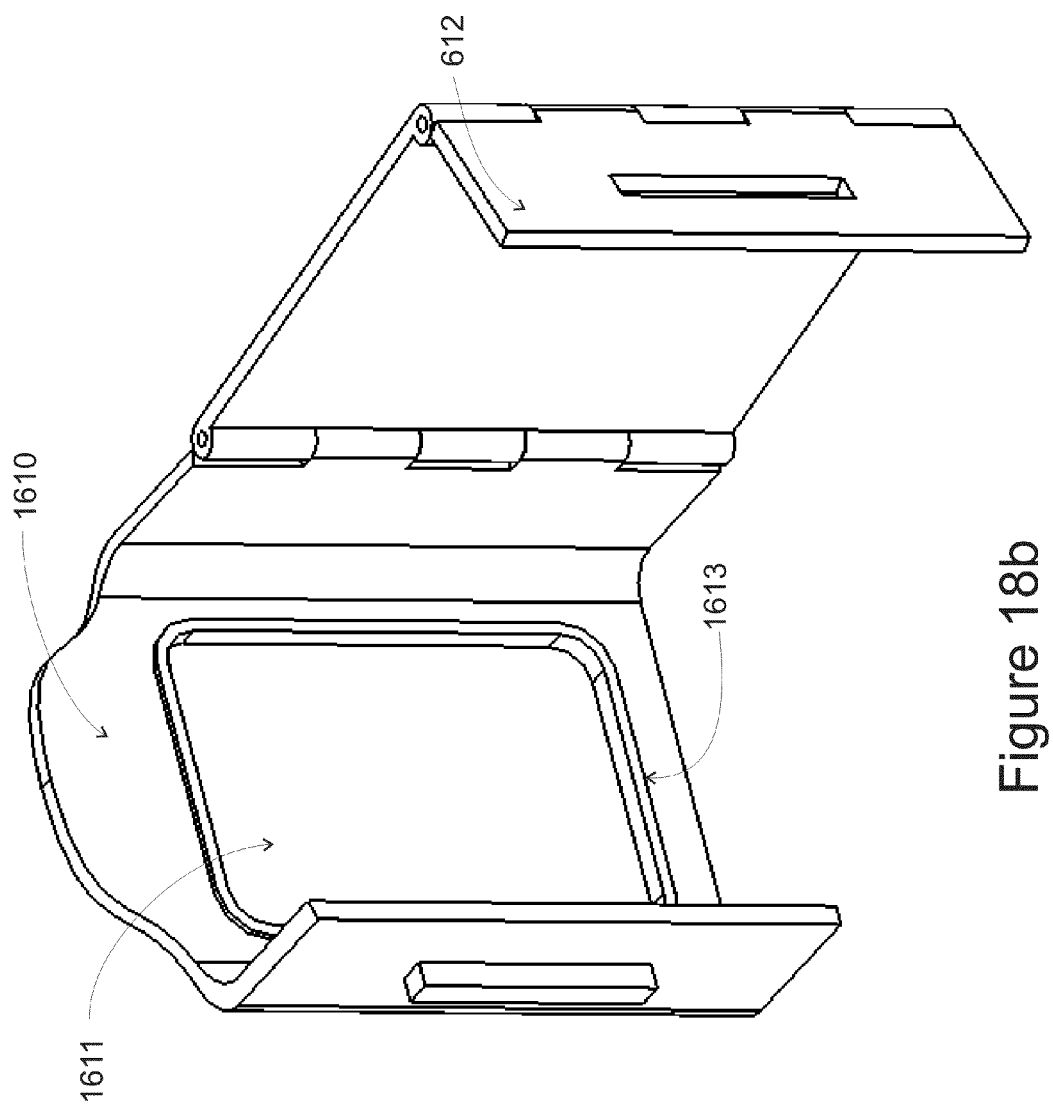

As shown in FIG. 18b, lock 1610 performs a similar function as housing 200 performs for digital cameras (as described above in conjunction with FIGS. 1-17) in respect of the following aspect. The portion of skin 1600 around skin hole 1601 that is proximate cell phone display 1595 when cell phone 1590 is encased, needs to be in water-tight relationship with cell phone 1590. Lock 1610, when locked, presses that portion of skin 1600 to cell phone 1590. Lock 1610 can be made of the same rigid material as housing 200 is but because it provides only a mechanism for effecting a water-tight fit around skin hole 1601 and not a rigid enclosure for the entire cell phone 1590, lock 1610 needs only to be dimensioned and profiled to provide such water-tight fit.

Figure 20:
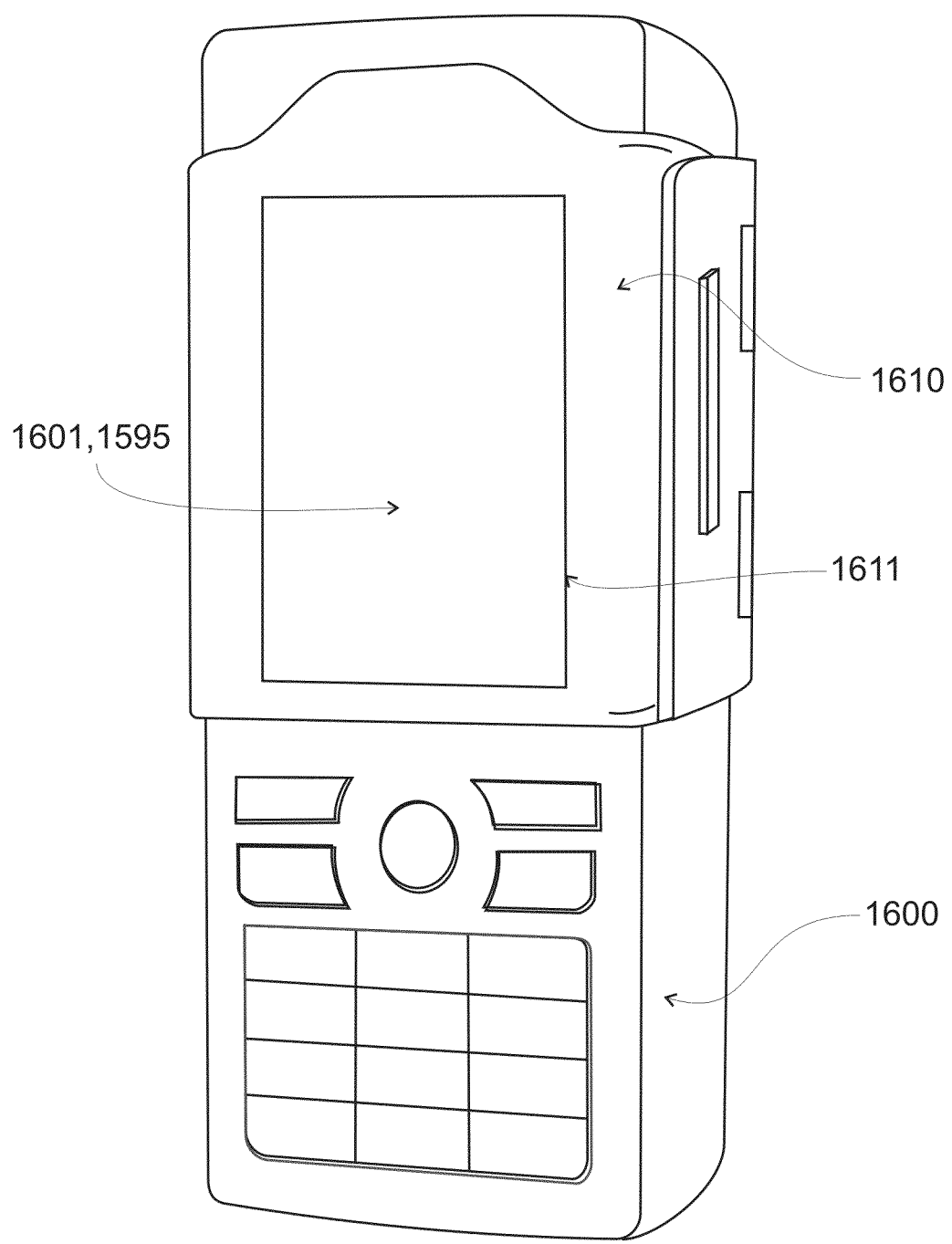
FIG. 20 is a front perspective view of a cell phone encased in the skin and locked.

As shown in FIGS. 18b and 20, lock 1610 has a transparent plate 1611 that aligns with cell phone display 1595 when cell phone 1590 is encased. Thus it is seen that there is visual alignment for the user along the axis of lock plate 1611, skin hole 1601 and cell phone display 1595. Lock 1610 has front and back halfshells or portions which are hingedly coupled by an integral plastic joint (shown) or by any other conventional hinge mechanism involving pins (not shown). Opposed to the hinge coupling, there is a conventional snap-fit, friction clamp or buckle-type fastener mechanism 1612 to effect a lock of lock 1610. Front portion of lock 1610 has plate 1611. Lock 1610 is profiled to snugly fit over skin-encased cell phone 1590 and when locked, provides a water-tight seal of skin 1600 about cell phone display 1595. Lock 1610 front portion may have an internal rectangular plastic ring or presser 1613 positioned so that when encased cell phone 1590 is placed within lock 1610, and lock 1610 is locked, presser 1613 presses the portion of skin 1600 around skin hole 1601 against or around cell phone display 1595 for urging and enforcing a water-tight fit therebetween. Plate 1611 may be made of transparent acrylic or similar synthetic material and may have magnification properties.

Alternatively (not shown), plate 1611 may be provided separately from lock 1610, and skin hole 1601 may be contoured with a double-lip boundary or equivalent that snugly receives and tightly holds (separate) plate 1611 in a water-tight relationship after cell phone 1590 is skin-encased.

FIG. 18a shows skin hole 1601 as rectangular to correspond with the geometry of subject cell phone 1595 which is rectangular. Other dimensions and geometries of skin holes may be designed responsively to the dimensions and geometry of the subject cell phone display, as long as the dimensions of the skin hole and its position in skin 1600, are such that the subject cell phone can be inserted therethrough for encasement, and when encased, skin hole aligns with cell phone display for viewing by user. For example, if the cell phone display has arcuate boundaries (e.g. the display is oval in geometry), the skin hole may be profiled and contoured with curves that still accept insertion of the cell phone therethrough, so that when the cell phone is skin-encased, the curvy skin hole aligns with the curvy display for user viewing; and lock 1610 (and plate 1611 and presser 1613) may be adjusted to align with the curvy skin hole.

Figure 22:
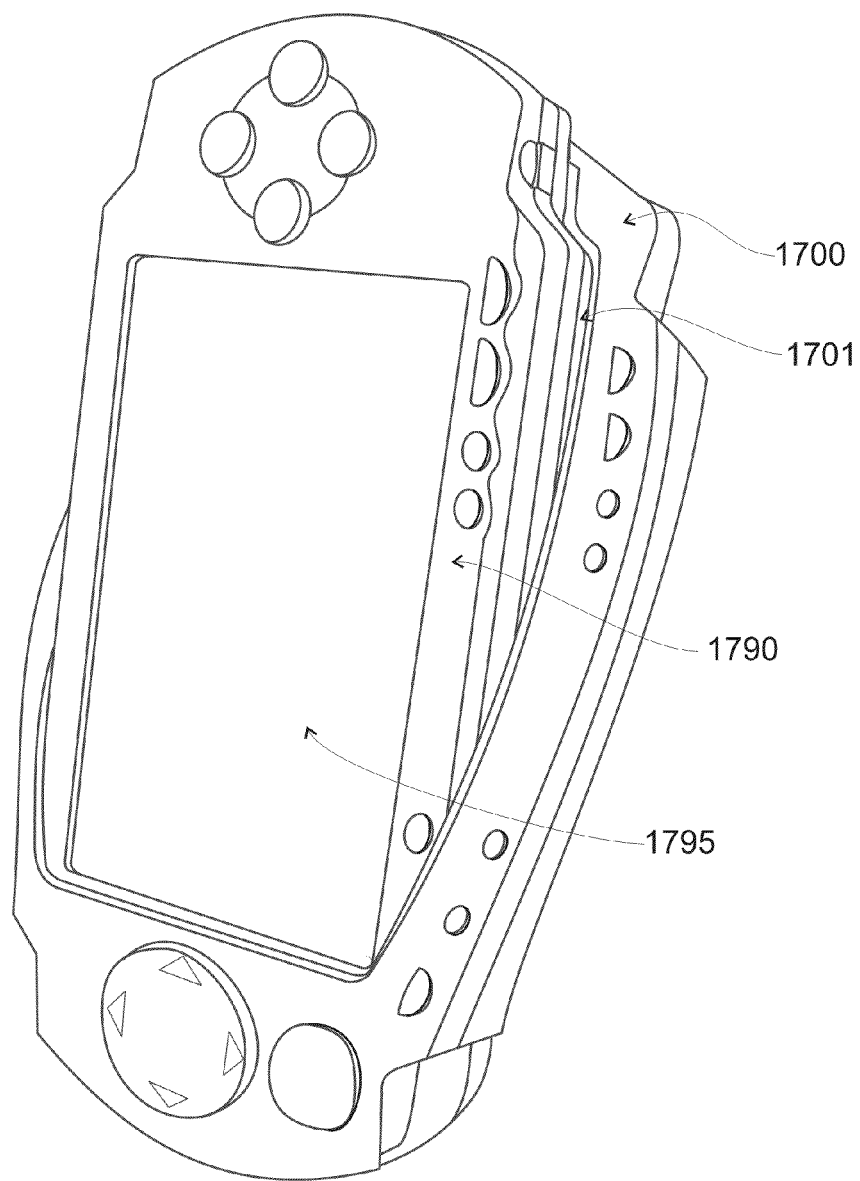

FIG. 22 shows a typical form factor for video game console 1790 (with keypad and other control buttons), and display 1795 (e.g. a viewing window or screen implemented as a LCD display).

Figure 21A:
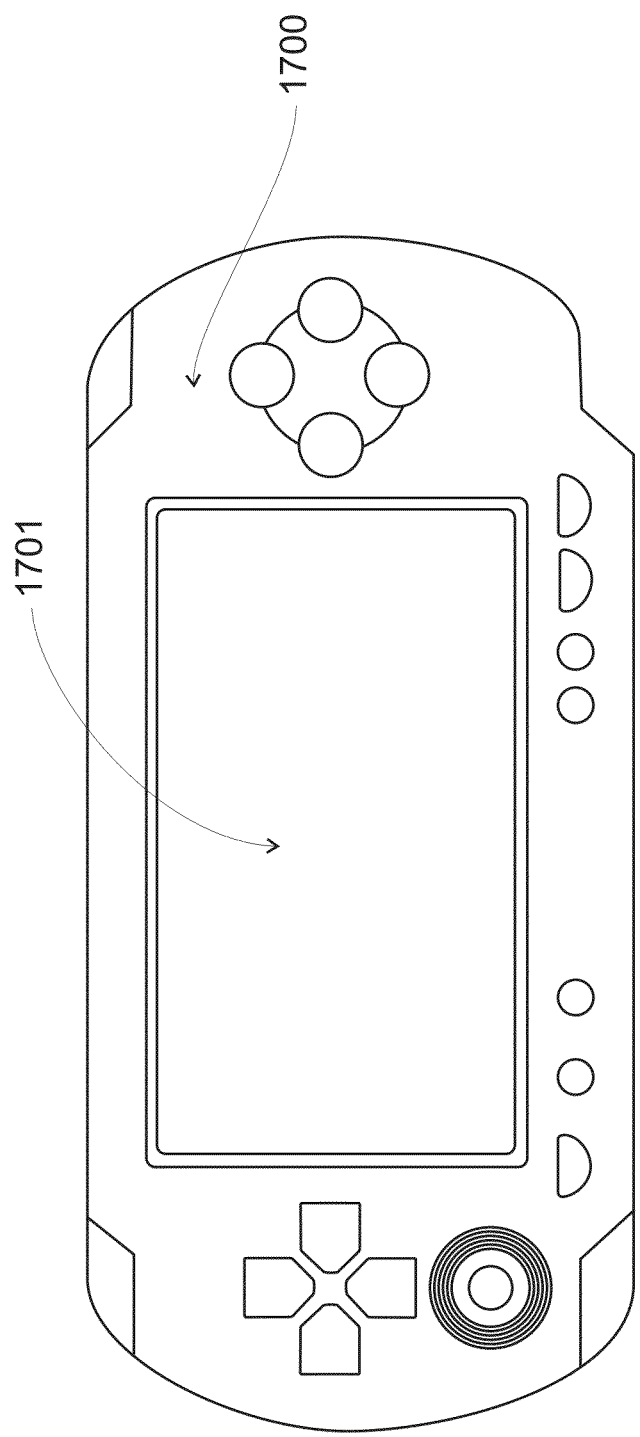
FIG. 21a is a top view of a skin for a game console.

As shown in FIG. 21a, skin 1700 is identical to skin 100 (for digital cameras, as described above in conjunction with FIGS. 1-17, and for cell phones in conjunction with FIGS. 18-20) in attributes, material and function, except that it is contoured for snug encasement of console 1790 and its form factor (with keypad and other control buttons and display 1795). As with the digital camera above, console 1790 fitted with skin 1700 (as shown in FIG. 23) is described herein as "skin-encased" or "encased".

Skin 1700 provides a complete water-tight, cushioned wrapper of console 1790, with the exception of skin hole 1701. Skin hole 1701 is positioned in skin 1700 to align (for user's viewing) with console display 1795 when console 1790 is encased by skin 1700 as shown in FIGS. 22 and 23. Skin hole 1701 is defined and dimensioned sufficiently for console 1790 to be inserted therethrough (as shown in FIG. 22), and afterwards, skin 1700 is adjusted and manipulated manually, much as a diver dons a wetsuit, to encase console 1790.

Figure 21B:
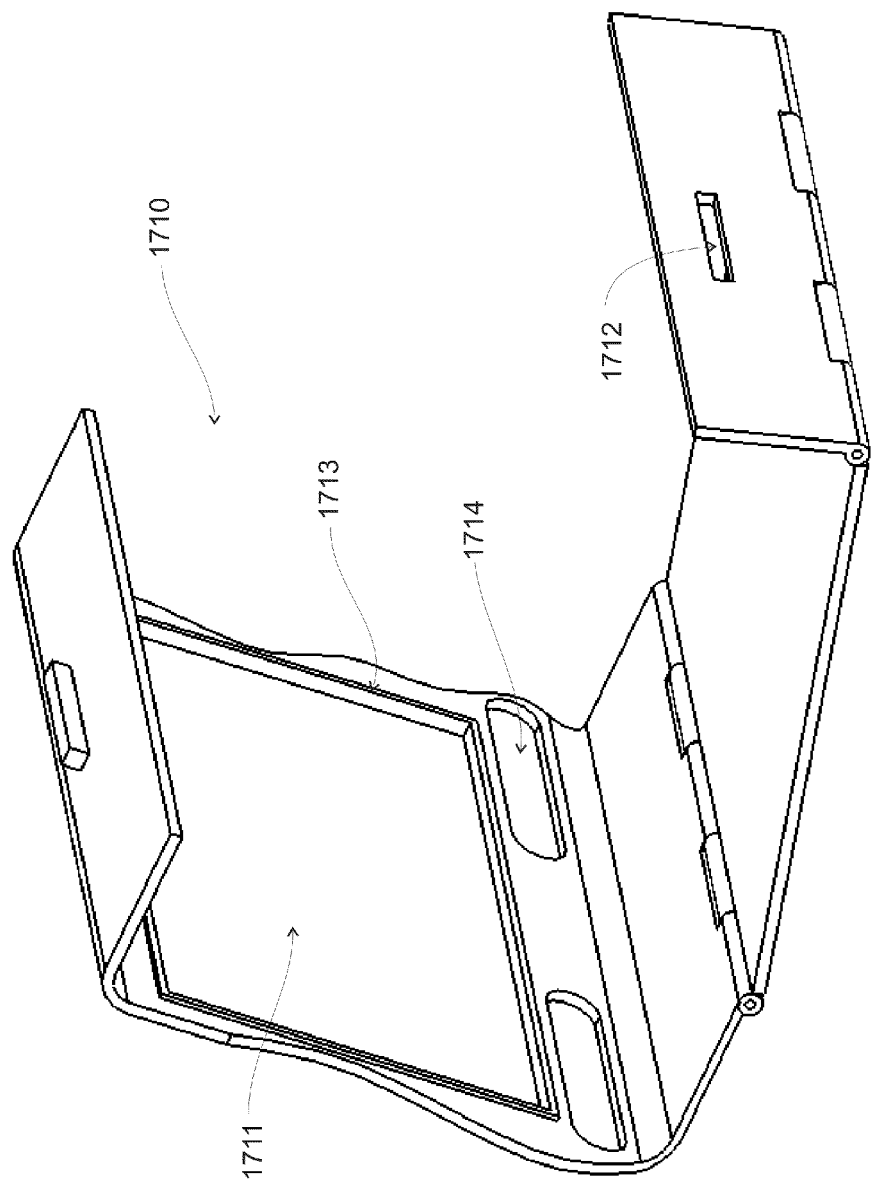

As shown in FIG. 21*b*, lock 1710 performs a similar function as housing 200 performs for digital cameras (as described above in conjunction with FIGS. 1-17) and for cell phones (in conjunction with FIGS. 18-20) in respect of the following aspect. The portion of skin 1700 around skin hole 1701 that is proximate console display 1795 when console 1790 is encased, needs to be in water-tight relationship with console 1790. Lock 1710, when locked, presses that portion of skin 1700 to console 1790. Lock 1710 can be made of the same rigid material as housing 200 is but because it provides only a mechanism for effecting a watertight fit around skin hole 1701 and not a rigid enclosure for the entire console 1790, lock 1710 needs only to be dimensioned and profiled to provide such water-tight fit.

Figure 23:
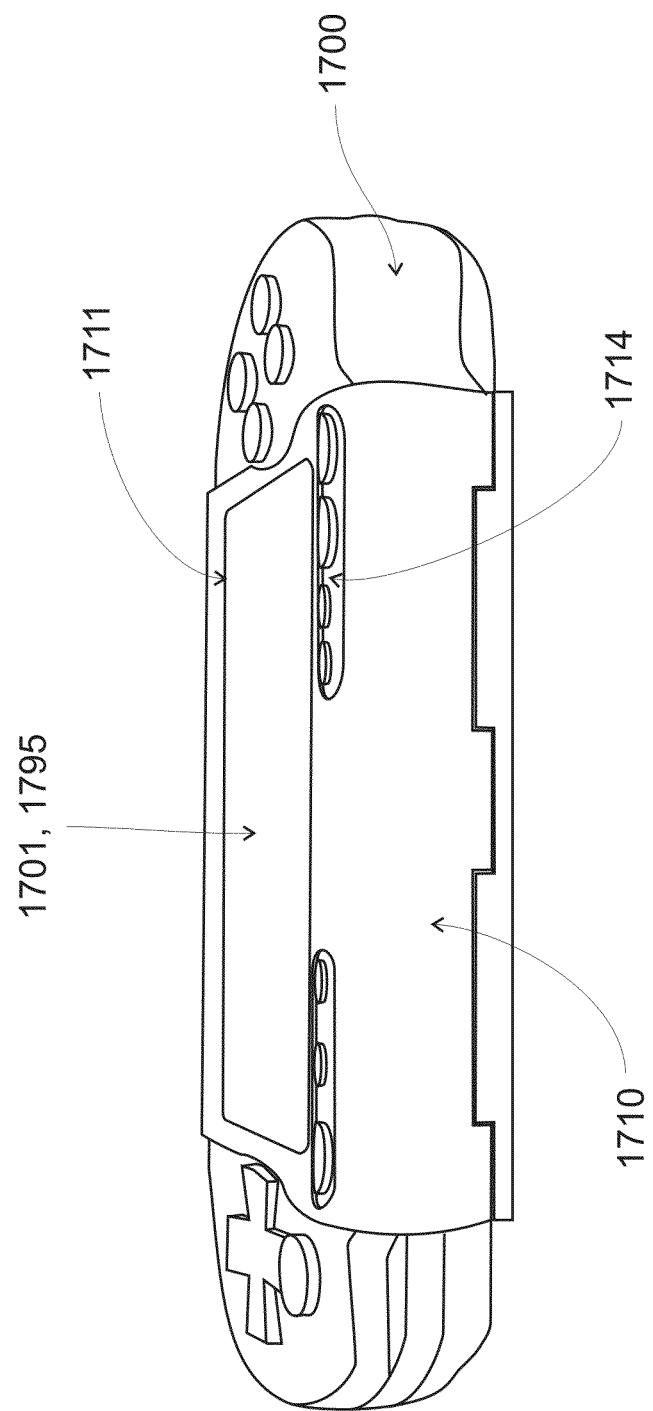
FIG. 23 is a front perspective view of a game console encased in the skin and locked.

As shown in FIGS. 21*b* and 23, lock 1710 has a transparent plate 1711 that aligns with console display 1795 when console 1790 is encased. Thus it is seen that there is visual alignment for the user along the axis of lock plate 1711, skin hole 1701 and console display 1795. Lock 1710 has front and back half-shells or portions which are hingedly coupled by an integral plastic joint (shown) or by any other conventional hinge mechanism involving pins (not shown). Opposed to the hinge coupling, there is a conventional snap-fit, friction clamp or buckle-type fastener mechanism 1712 to effect a lock of lock 1710. Front portion of lock 1610 has plate 1611. Lock 1710 is profiled to snugly fit over skin-encased console 1790 and when locked, provides a water-tight seal of skin 1700 about console display 1795. Lock 1710 front portion may have an internal rectangular plastic ring or presser 1713 positioned so that when encased console 1790 is placed within lock 1710, and lock 1710 is locked, presser 1713 presses the portion of skin 1700 around skin hole 1701 against or around console display 1795 for urging and enforcing a water-tight fit therebetween. Plate 1711 may be made of transparent acrylic or similar synthetic material and may have magnification properties.

Alternatively (not shown), plate 1711 may be provided separately from lock 1710, and skin hole 1701 may be contoured with a double-lip boundary or equivalent that snugly receives and tightly holds (separate) plate 1711 in a water-tight relationship after console 1790 is skin-encased.

As seen in FIGS. 21*b* and 23, lock 1710 has hole 1714 to accommodate the keypad and other control buttons of console 1790.

FIG. 21*a* shows skin hole 1701 as rectangular to correspond with the geometry of console display 1795. Other dimensions and geometries of skin holes may be designed responsively to the dimensions and geometry of the subject console display, as long as the overall dimensions of the skin hole and its position in skin 1700, are such that the subject console can be inserted therethrough for encasement, and when encased, skin hole aligns with console display for good viewing by user. For example, if the console display has arcuate boundaries (e.g. the display is oval in geometry), the skin hole may be profiled and contoured with curves that still accept insertion of the console therethrough, so that when the console is skin-encased, the curvy skin hole aligns with the curvy display for user viewing; and lock 1710 (and plate 1711 and presser 1713) may be adjusted to align with the curvy skin hole.

When camera 50 within skin 100 is submerged, the ambient pressure increases with depth. At a certain depth, the ambient pressure will keep some of the buttons in a pressed condition (for example, between 5 m to 8 m for normal spring-loaded push-button on electronic devices), rendering the camera nonoperational and thereby restricting the range of depth and enjoyment of the userdiver.

Figure 26A:
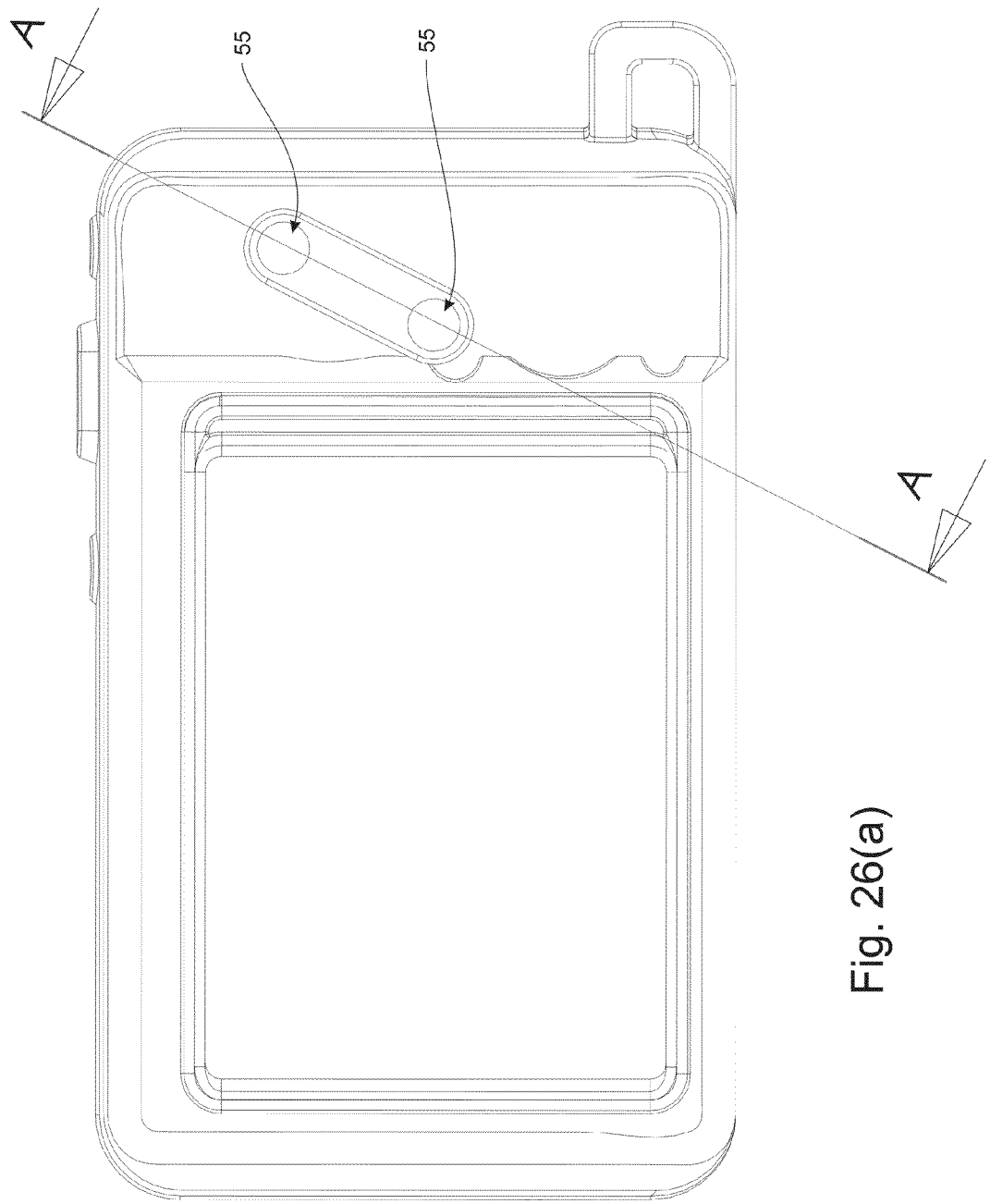
FIG. 26 (a) a back view of the camera within its skin.
Figure 26B:
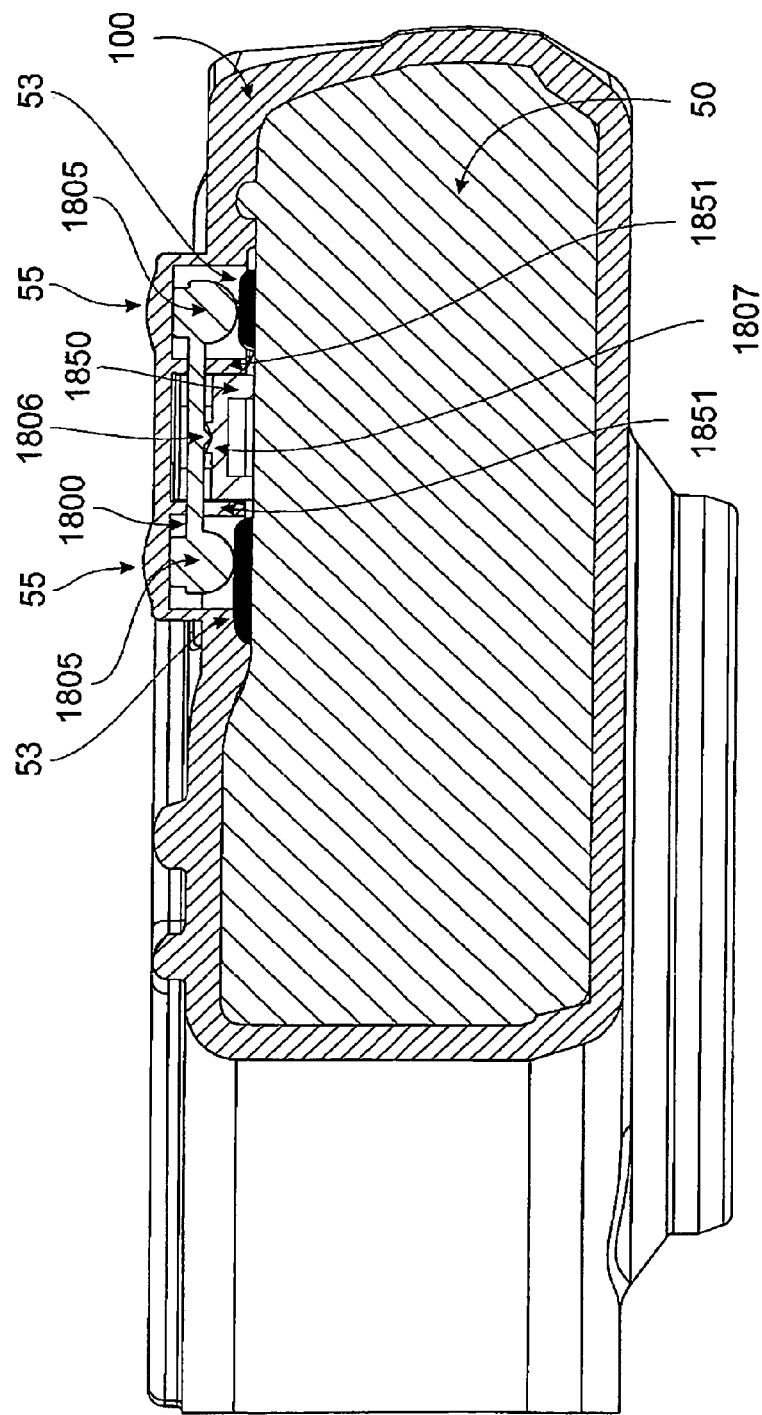

Reference is made to FIGS. 24-26 with the explanation below of how a "see-saw" mechanism addresses this limitation.

A "see-saw" beam 1800 is attached within skin 100, and positioned relative to camera 50, as follows. When camera 50 or other electronic device is inserted into skin 100, two opposed seats 1805 of "see-saw" 1800 are positioned on associated camera control buttons 53. Skin 100 has two bumps 55 on the outer surface corresponding to said opposed seats 1805, that provides easy finger manipulation by the user-diver. Centrally between said opposed seats 1805 of beam 1800 is beam fulcrum 1806.

"see-saw" 1800 is positioned within support 1850 and is loosely supported within channel 1810 therethough. Support 1850 has a centrally positioned, concave conical fulcrum support shoulder 1807 within which beam fulcrum 1806 pivots.

Support 1850 has legs 1851 which rest on a firm part of camera 50. The ambient pressure will act equally on both sides of "see-saw" 1800 which acts to keep skin 100 separated from camera buttons 53, thereby allowing user-diver to go deeper with camera 50 still in operational mode.

"see-saw" 1800 and support 1850 are made conventionally of polycarbonate plastic or equivalent. Skin 100 is internally profiled to form a pocket to friction-fit accept and hold support 1850 (and thereby "see-saw" beam 1800).

Alternatively, support 1850 can be part of the molding process of skin 100 so that it becomes part thereof.

"see-saw" beam 1800 can be a "2-seater", as shown and described but can also be a "3-seater", or a "4-seater" to be responsively protective of more camera control buttons 53 against the effects of the ambient pressure. Thus the "seesaw" can take the shape of a symmetric cross or symmetric Y-shape, with, respectively, four and three seats at the distal ends of each beam portion thereof radiating from a central fulcrum, operating much like the basic "2-seater" "seesaw" beam 1800.

Where used in the various figures of the drawings, the same numerals designate the same or similar parts. Furthermore, when the terms "top", "bottom", "first", "second", "inside", "outside", "edge", "side", "front", "back", "length", "width", "inner", "outer", and similar terms are used herein, it should be understood that these terms have reference only to the structure shown in the drawings as it would appear to a person viewing the drawings and are utilized only to facilitate describing the invention.

Although the method, skin and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A waterproof digital camera combination, comprising:
   (a) digital device with a first control button and a second control button that are each of the spring-loaded depressible type;
   (b) a synthetic skin that encases said digital device by snugly fitting therearound to provide a water-tight enclosure thereof, including a first portion of said skin and a second portion of said skin that correspond respectively to said first and second buttons whereby a user can depress either one of said skin portions to depress the corresponding button;
   (c) a separator located completely within said synthetic skin between said two buttons and said two corresponding skin portions, said separator under submarine ambient pressure, being movable between:
   (i) first position of separation between said two buttons and said two corresponding skin portions and
   (ii) second position of depressing contact between one, and only one, of said two buttons and its said corresponding skin portion,
   wherein said separator is biased toward said first position and is movable towards said second position by user finger-manipulation of said one of two corresponding skin portions.

2. The combination of claim 1, wherein said separator has a rigid beam that is fulcrumed centrally between said two buttons and said two corresponding skin portions, and said beam has first and second, opposed, end portions, with first end portion located between said first button and said corresponding skin portion and second end portion located between said second button and said corresponding skin portion.

3. The combination of claim 2 wherein said end portions have a curved surface to contact said button in said second position of separator.

4. The combination of claim 1 wherein said one of said corresponding skin portion has a bump for user finger manipulation.

5. The combination of claim 2 wherein said one of said corresponding skin portion has a bump for user finger manipulation.

* * * * *